(12) United States Patent
Maetaki

(10) Patent No.: US 7,679,838 B2
(45) Date of Patent: Mar. 16, 2010

(54) ZOOM LENS AND OPTICAL APPARATUS INCLUDING THE SAME

(75) Inventor: Satoshi Maetaki, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/354,778

(22) Filed: Jan. 16, 2009

(65) Prior Publication Data

US 2009/0185283 A1    Jul. 23, 2009

(30) Foreign Application Priority Data

Jan. 18, 2008  (JP)  ............... 2008-009079

(51) Int. Cl.
*G02B 15/14*    (2006.01)
(52) U.S. Cl. ................ 359/691; 359/689
(58) Field of Classification Search ........... 359/676, 359/689, 691
See application file for complete search history.

(56) References Cited

U.S. PATENT DOCUMENTS

| | | | |
|---|---|---|---|
| 6,618,210 B2 | 9/2003 | Noguchi | |
| 6,646,815 B2 | 11/2003 | Nobe | |
| 6,646,817 B2 | 11/2003 | Katsuma | |
| 7,027,379 B2 | 4/2006 | Kaneko | |
| 7,289,273 B2 | 10/2007 | Mihara | |
| 7,382,551 B2 * | 6/2008 | Sekita | ............ 359/689 |
| 7,535,650 B2 * | 5/2009 | Ohashi | ............ 359/676 |

* cited by examiner

*Primary Examiner*—Alicia M Harrington
(74) *Attorney, Agent, or Firm*—Canon USA Inc IP Div

(57) ABSTRACT

A zoom lens includes a first lens unit having a negative refractive power and a second lens unit having a positive refractive power, which are arranged in order from the object side to the image side. The zoom lens performs zooming by changing a distance between the lens units. The first lens unit includes a compound optical element including a lens element and a resin layer having optical characteristics different from optical characteristics of the lens element, the resin layer being laminated on the lens element. An Abbe number vdg of a material of the lens element, an Abbe number vdj of a material of the resin layer, and an anomalous partial dispersion ratio ΔθgFj of the material of the resin layer are adequately set.

10 Claims, 27 Drawing Sheets

ZOOM LENS AND OPTICAL APPARATUS INCLUDING THE SAME

BACKGROUND OF THE INVENTION

1. Field of the Invention

The present invention relates to a zoom lens and an optical apparatus including the zoom lens, and is suitable for, for example, still cameras, digital cameras, video cameras, projectors, and the like.

2. Description of the Related Art

Recently, the size of image-pickup apparatuses (cameras), such as video cameras and digital still cameras, which include solid-state image pickup elements, has been reduced. Accordingly, there has been a demand for small zoom lenses having a wide field angle for use as optical systems in the image-pickup apparatuses.

In this type of camera, various optical elements, such as a low-pass filter and a color compensating filter, are placed between the rearmost portion of the lens and an image-pickup element. Therefore, a zoom lens used in this type of camera is required to have a relatively long back focus.

In addition, in a camera including an image-pickup element for obtaining a color image, to avoid shading of brightness and color, a zoom lens is required to have telecentricity on the image side.

A so-called retrofocus zoom lens including a lens unit having a negative refractive power and a lens unit having a positive refractive power in order from the object side to the image side is known as a wide-field-angle zoom lens having a long back focus and good telecentricity on the image side.

A three-unit zoom lens including a first lens unit having a negative refractive power, a second lens unit having a positive refractive power, and a third lens unit having a positive refractive power in order from the object side to the image side is known as a retrofocus zoom lens (U.S. Pat. Nos. 7,289,273, 6,618,210, 6,646,815, 6,646,817, and 7,027,379).

U.S. Pat. Nos. 7,289,273, 6,646,817, and 7,027,379 describe a small zoom lens having high optical performance which adequately corrects chromatic aberrations using a compound optical element obtained by laminating a resin layer on a lens made of glass.

Recently, so-called retractable zoom lenses have been used in many cameras to reduce the size of the cameras. In a retractable zoom lens, when no shooting operation is performed, distances between lens units are reduced to distances different from those set in a shooting operation, so that the amount of projection from the camera body can be reduced.

In general, when the number of lenses included in each lens unit of a zoom lens increases, the length of each lens unit along the optical axis also increases. Accordingly, even when the zoom lens has a retractable structure, the length of the zoom lens in the retracted state increases. Therefore, it is important to reduce the number of lenses in the lens units.

However, if the number of lenses included in each lens unit is simply reduced to reduce the length in the retracted state, it becomes difficult to correct aberrations like spherical aberration and coma aberration that affect monochromatic imaging performance. In addition, the kinds of glass materials that can be used are limited, and it can be extremely difficult to correct chromatic aberrations.

To reduce the number of lenses without degrading the imaging performance, various methods are used in which a lens surface included in the zoom lens is formed in an aspherical shape. However, in the case where an aspherical surface is formed, although aberrations regarding the imaging performance for a single color can be corrected, it is difficult to correct the chromatic aberrations, which are largely affected by the selection of the glass material.

In particular, in a retrofocus zoom lens, if the kinds of glass materials that can be used are limited to obtain a wide field angle, it is extremely difficult to adequately correct the chromatic aberration of magnification.

In addition, in the retrofocus zoom lens, the lens structure is asymmetric with respect to an aperture stop as a whole. Therefore, it is extremely difficult to obtain high optical performance over the entire zooming range while reducing the number of lenses to reduce the size of the zoom lens.

In particular, in the retrofocus zoom lens, to obtain high optical performance while reducing the size of the lens, it is important to adequately set the lens structure of a first lens unit having a negative refractive power to adequately correct variations in various aberrations including the chromatic aberrations during zooming. This is also important to reduce the size of the entire lens system.

An aspherical lens manufactured by laminating a resin layer or the like on a lens body and pressing a mold having an aspherical shape against the resin layer is often used in a zoom lens. However, in this type of aspherical lens, the chromatic aberrations are not positively corrected using the difference between the materials of the lens and the resin.

SUMMARY OF THE INVENTION

The present invention provides a high-zoom-ratio, wide-field-angle zoom lens having high optical performance which adequately corrects various aberrations including chromatic aberrations (in particular, the chromatic aberration of magnification at the wide-angle end). The present invention also provides an optical apparatus including the zoom lens.

According to an aspect of the present invention, a zoom lens includes a first lens unit having a negative refractive power and a second lens unit having a positive refractive power. The first lens unit and the second lens unit are arranged in order from the object side to the image side. The zoom lens performs zooming by changing a distance between the lens units. The first lens unit includes a compound optical element including a lens element and a resin layer having optical characteristics different from optical characteristics of the lens element, the resin layer being laminated on the lens element. The following conditions are satisfied:

$$31 < |\nu dg - \nu dj|$$

$$26 > \nu dj$$

$$0.10 > |\Delta\theta gFj|$$

where $\nu dg$ is an Abbe number of a material of the lens element, and $\nu dj$ and $\Delta\theta gFj$ are an Abbe number and an anomalous partial dispersion ratio, respectively, of a material of the resin layer.

Further features of the present invention will become apparent from the following description of exemplary embodiments with reference to the attached drawings.

DESCRIPTION OF THE EMBODIMENTS

Each of zoom lenses according to embodiments of the present invention includes at least two lens units, which are a first lens unit having a negative refractive power and a second lens unit having a positive refractive power, arranged in order from the object side to the image side. In addition, each zoom lens is a retrofocus zoom lens in which distances between the lens units are changed during zooming.

Figure 1:
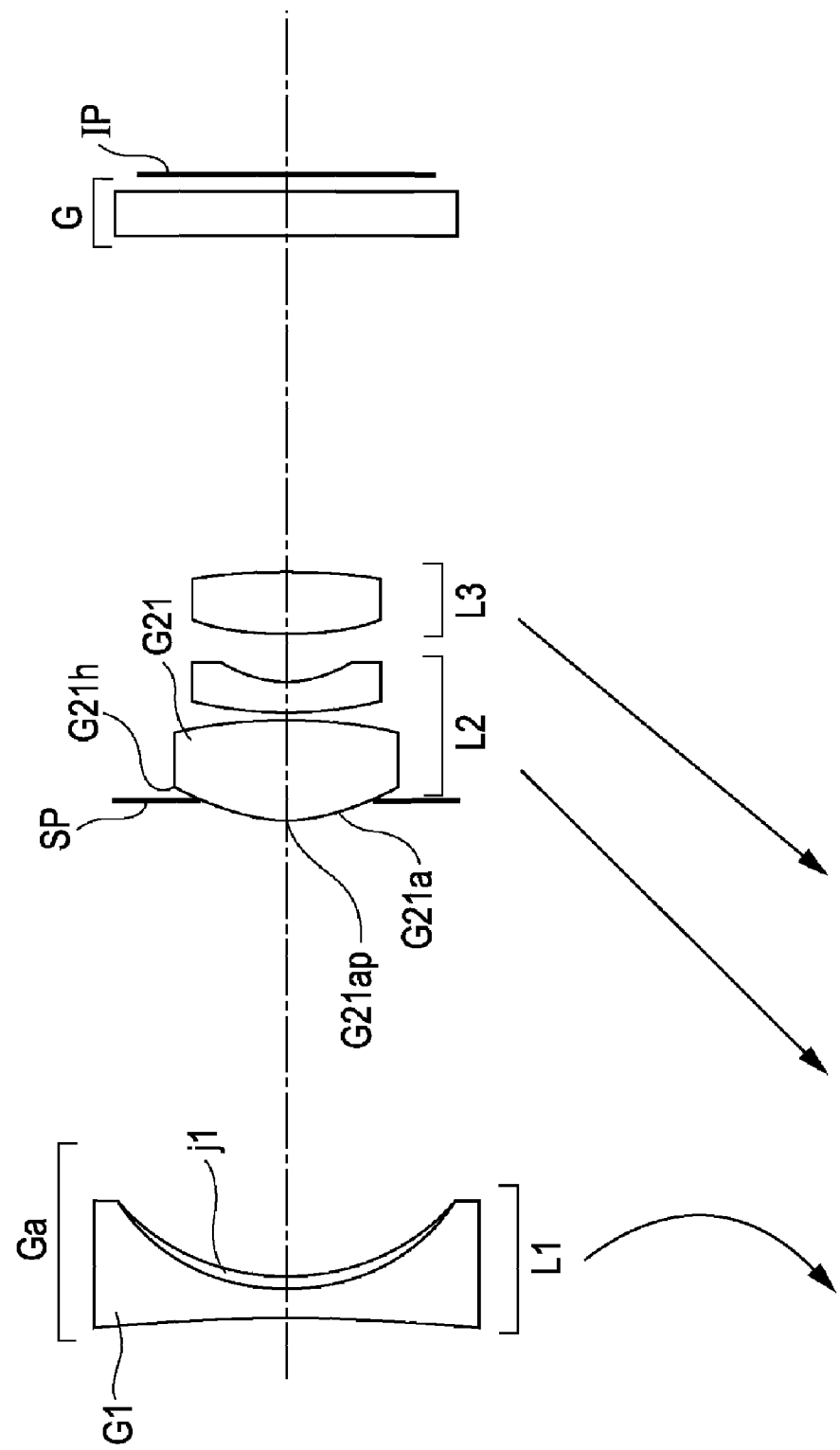
FIG. 1 is an optical sectional view of a zoom lens according to a first embodiment.
Figure 2:
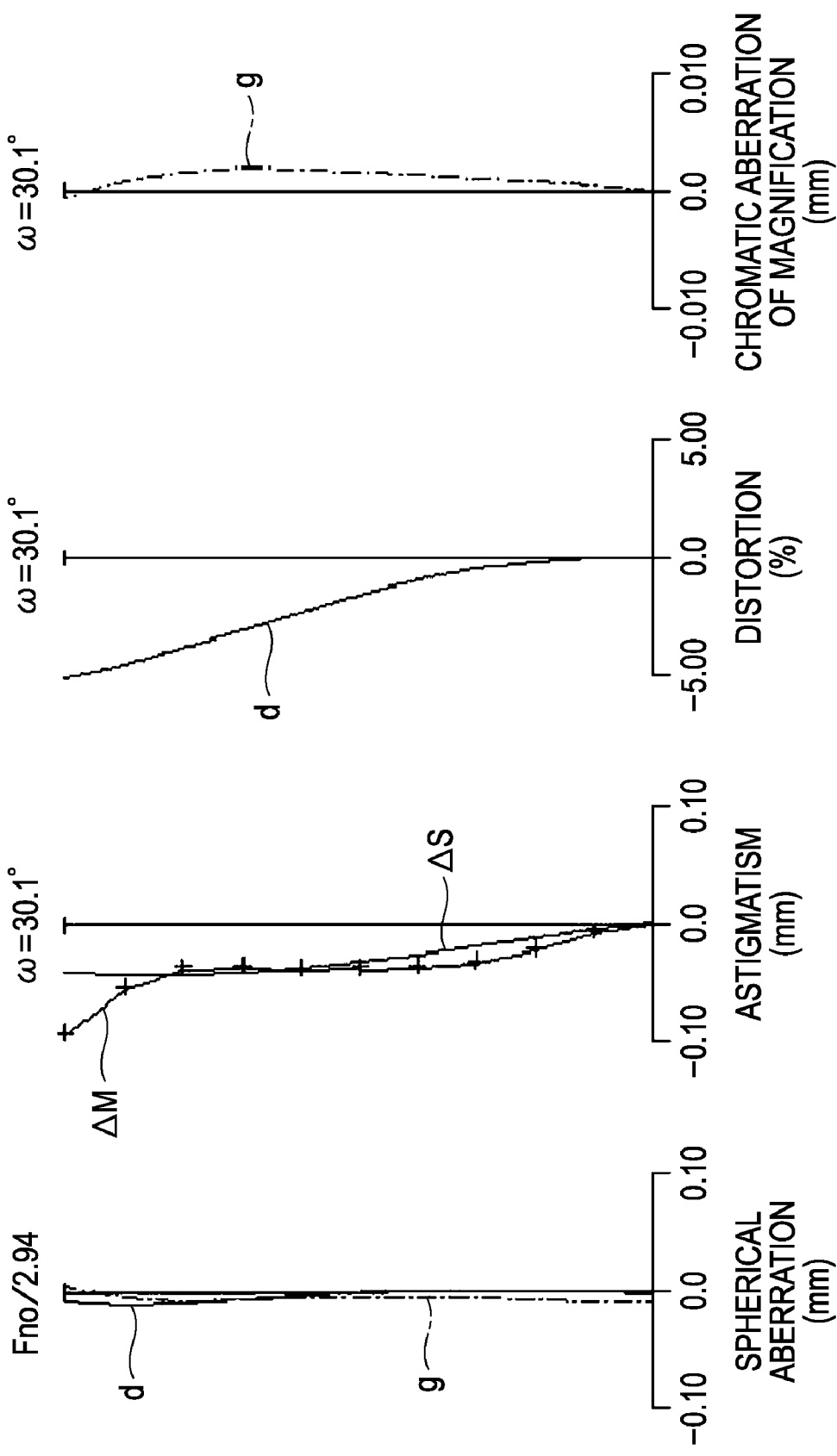
FIG. 2 illustrates aberration diagrams of the zoom lens according to the first embodiment at the wide-angle end.
Figure 3:
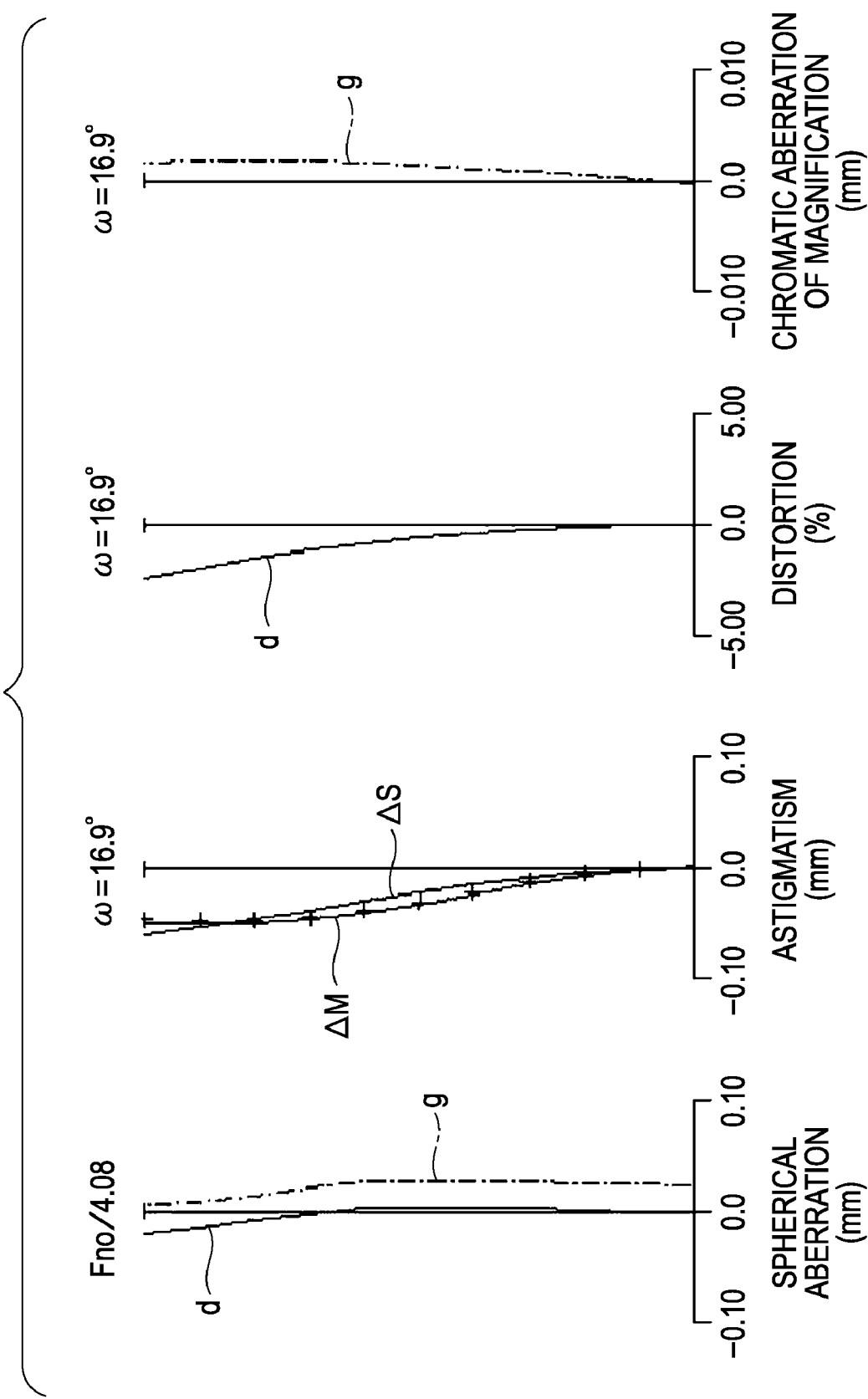
FIG. 3 illustrates aberration diagrams of the zoom lens according to the first embodiment at an intermediate zooming position.
Figure 4:
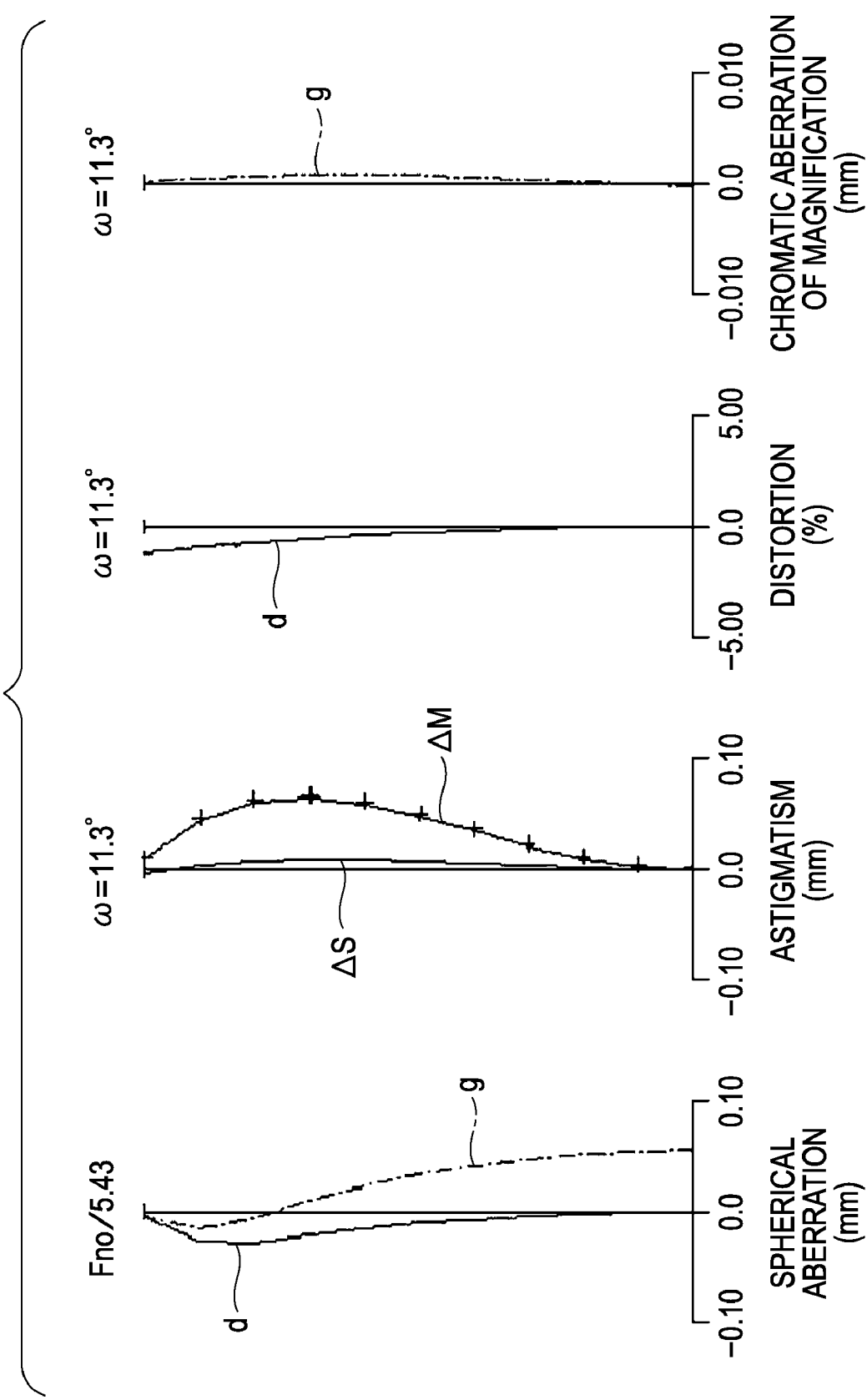
FIG. 4 illustrates aberration diagrams of the zoom lens according to the first embodiment at the telephoto end.

FIG. 1 is a sectional view of a zoom lens according to a first embodiment of the present invention. FIGS. 2 to 4 illustrate aberration diagrams of the zoom lens according to the first embodiment at the wide-angle end (short-focal-length end), an intermediate zooming position, and the telephoto end (long-focal-length end), respectively, when an object at infinity is in focus.

Figure 5:
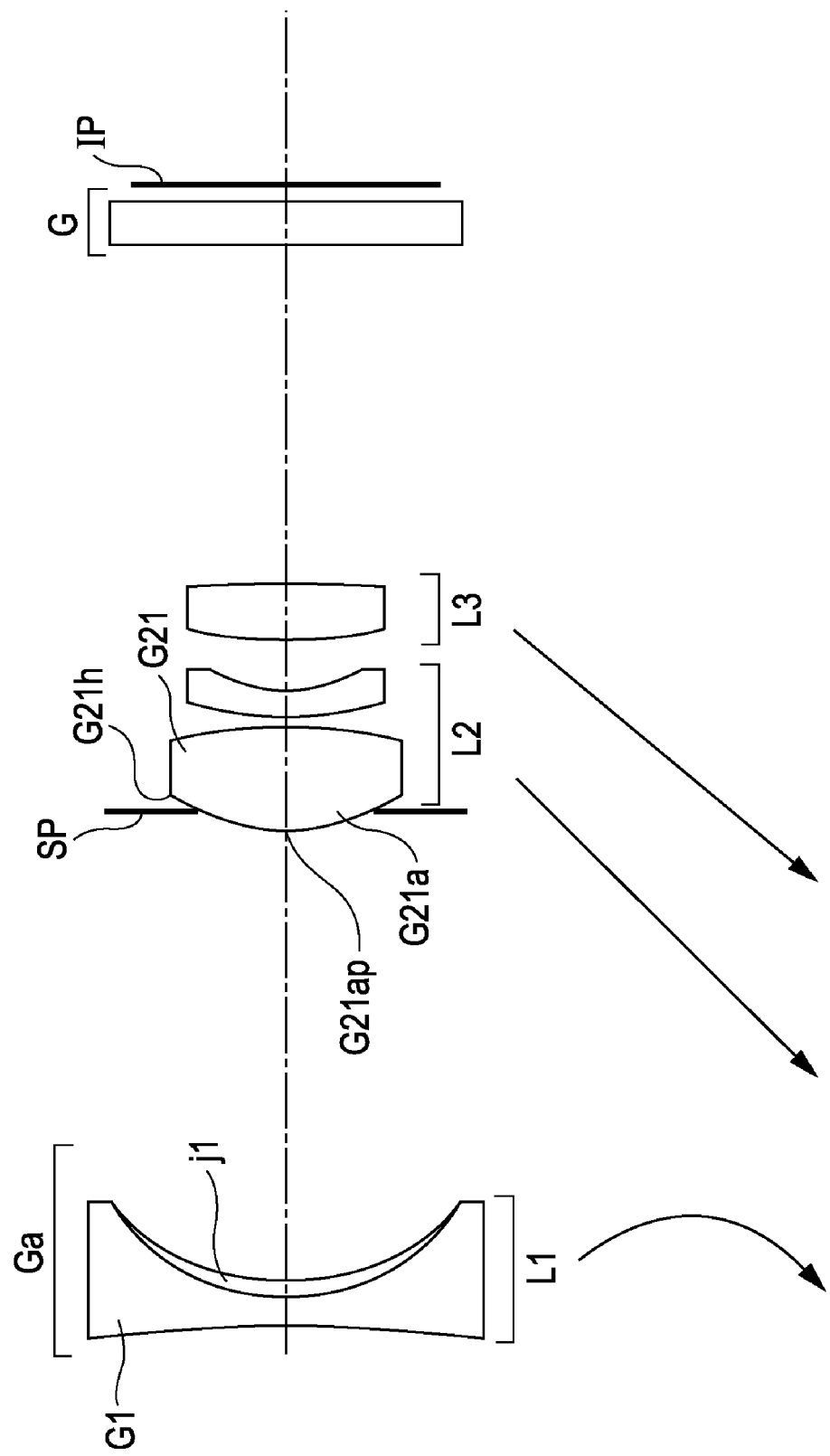
FIG. 5 is an optical sectional view of a zoom lens according to a second embodiment.
Figure 6:
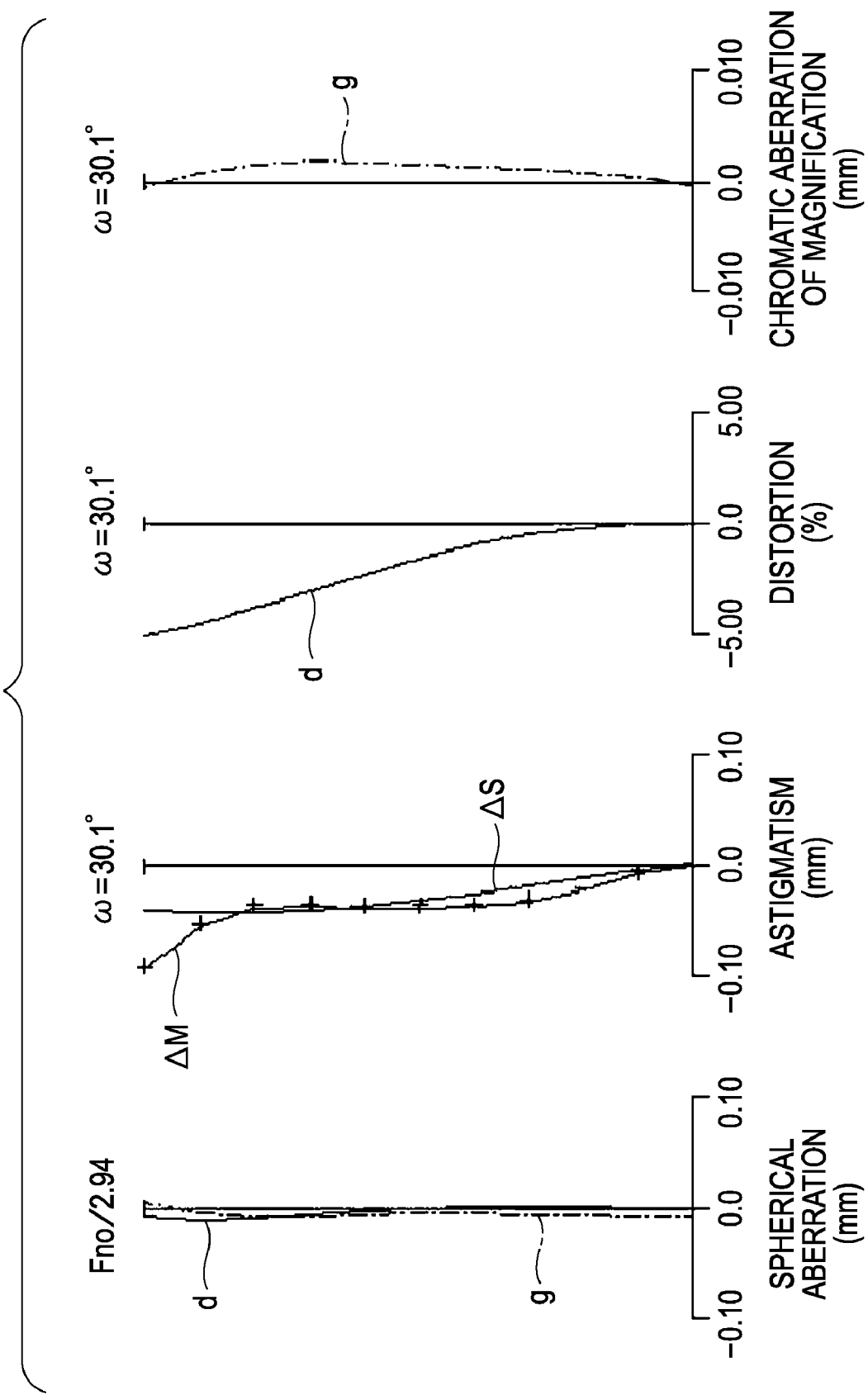
FIG. 6 illustrates aberration diagrams of the zoom lens according to the second embodiment at the wide-angle end.
Figure 7:
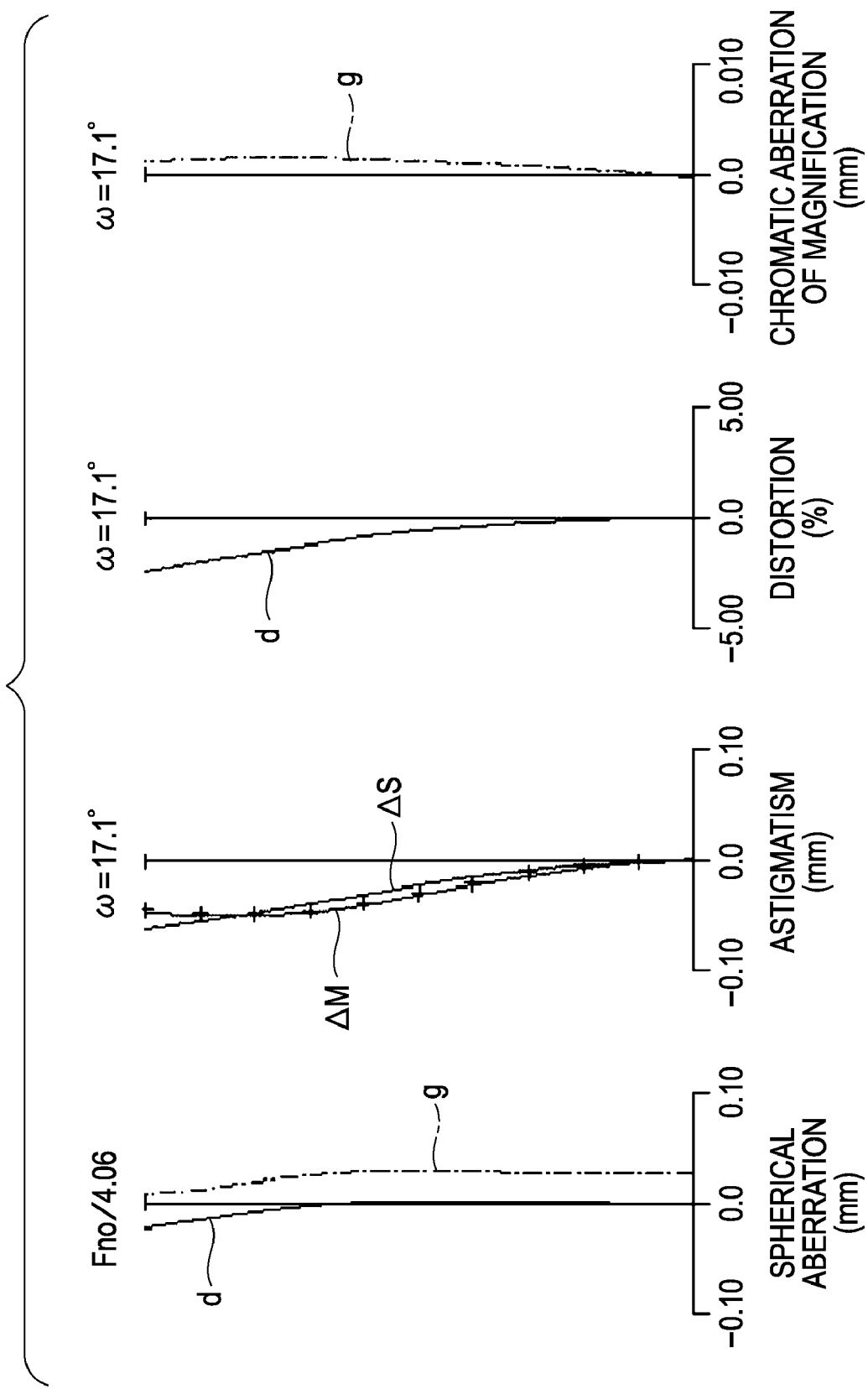
FIG. 7 illustrates aberration diagrams of the zoom lens according to the second embodiment at an intermediate zooming position.
Figure 8:
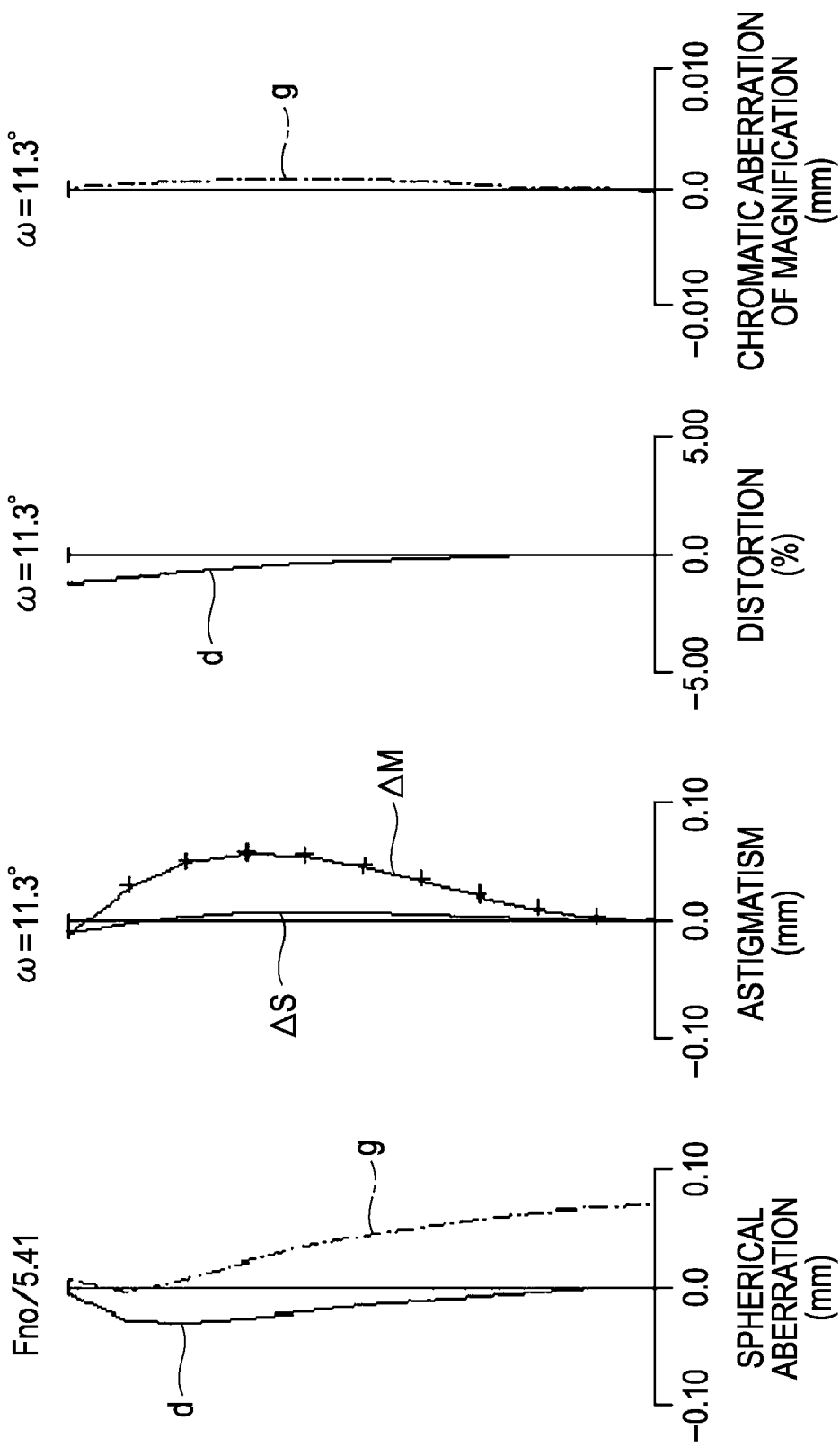
FIG. 8 illustrates aberration diagrams of the zoom lens according to the second embodiment at the telephoto end.

FIG. 5 is a sectional view of a zoom lens according to a second embodiment of the present invention. FIGS. 6 to 8 illustrate aberration diagrams of the zoom lens according to the second embodiment at the wide-angle end, an intermediate zooming position, and the telephoto end, respectively, when an object at infinity is in focus.

Figure 9:
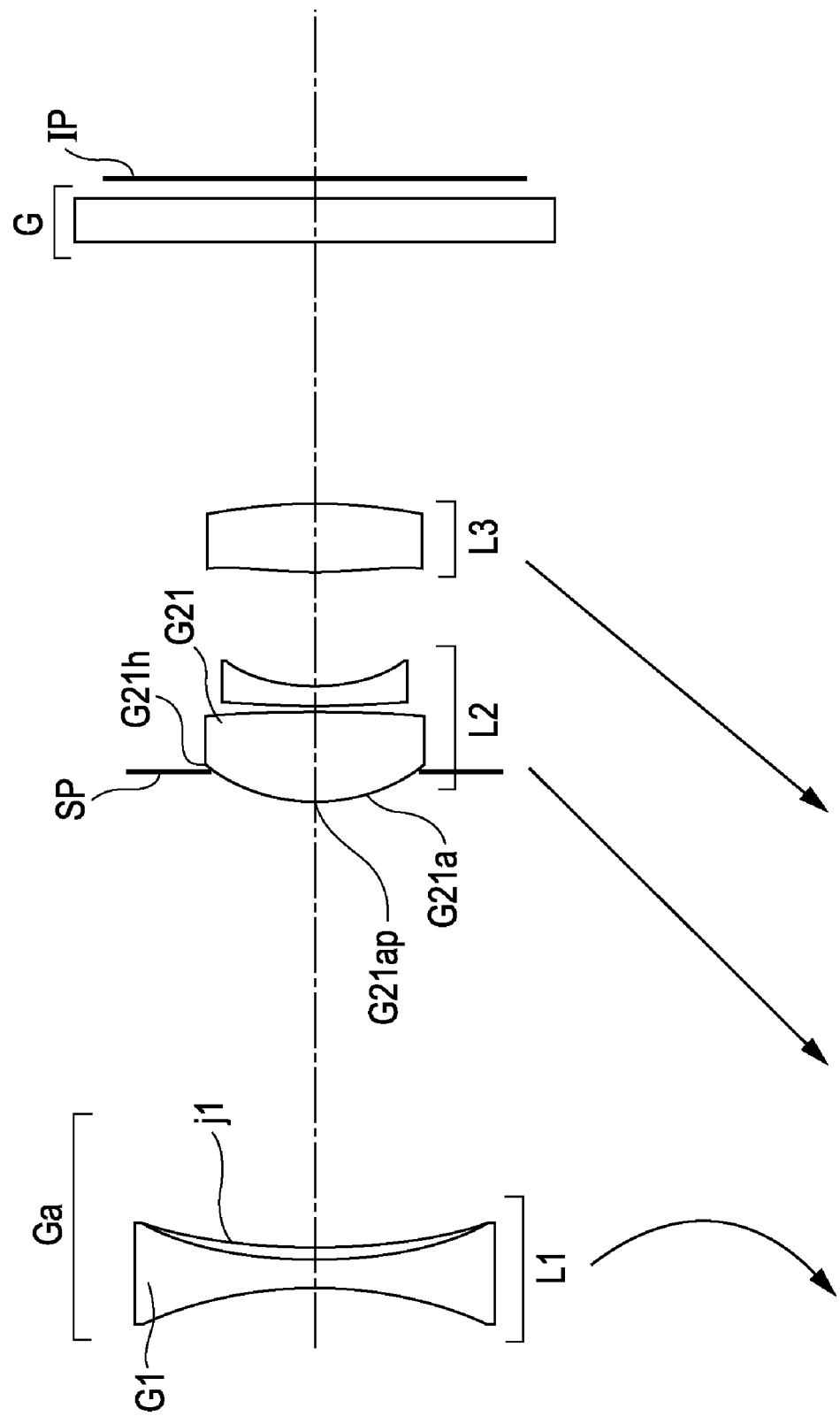
FIG. 9 is an optical sectional view of a zoom lens according to a third embodiment.
Figure 10:
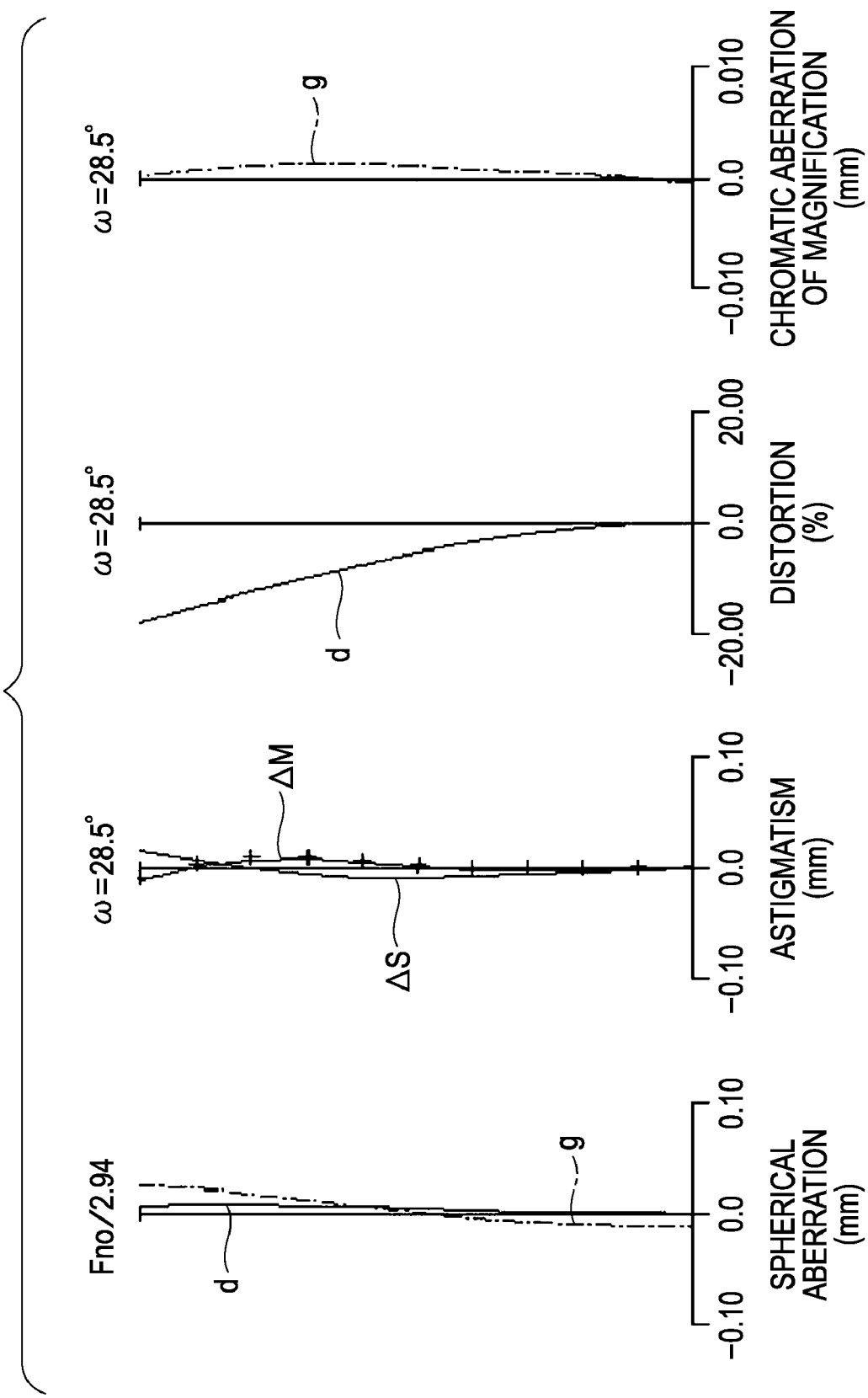
FIG. 10 illustrates aberration diagrams of the zoom lens according to the third embodiment at the wide-angle end.
Figure 11:
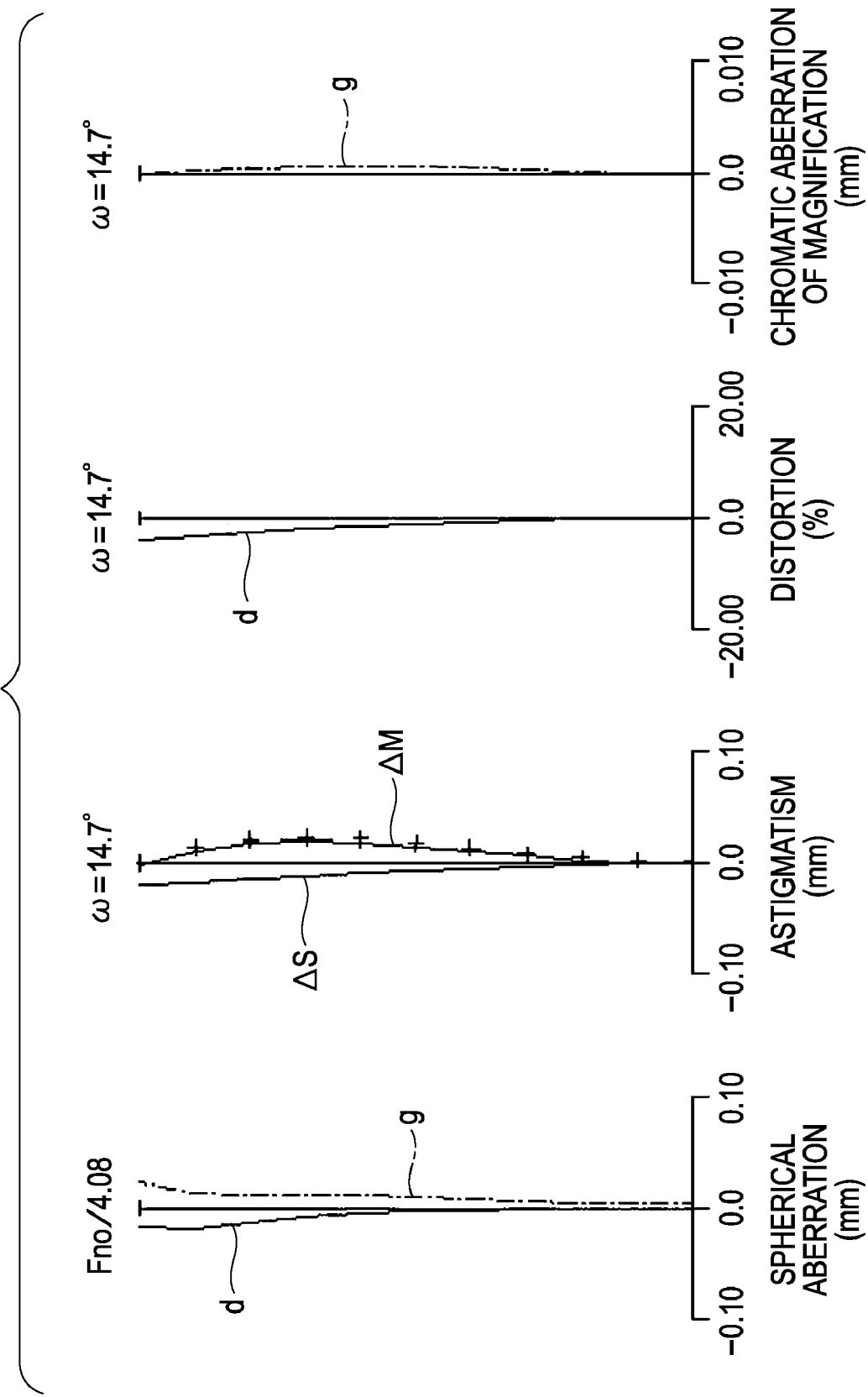
FIG. 11 illustrates aberration diagrams of the zoom lens according to the third embodiment at an intermediate zooming position.
Figure 12:
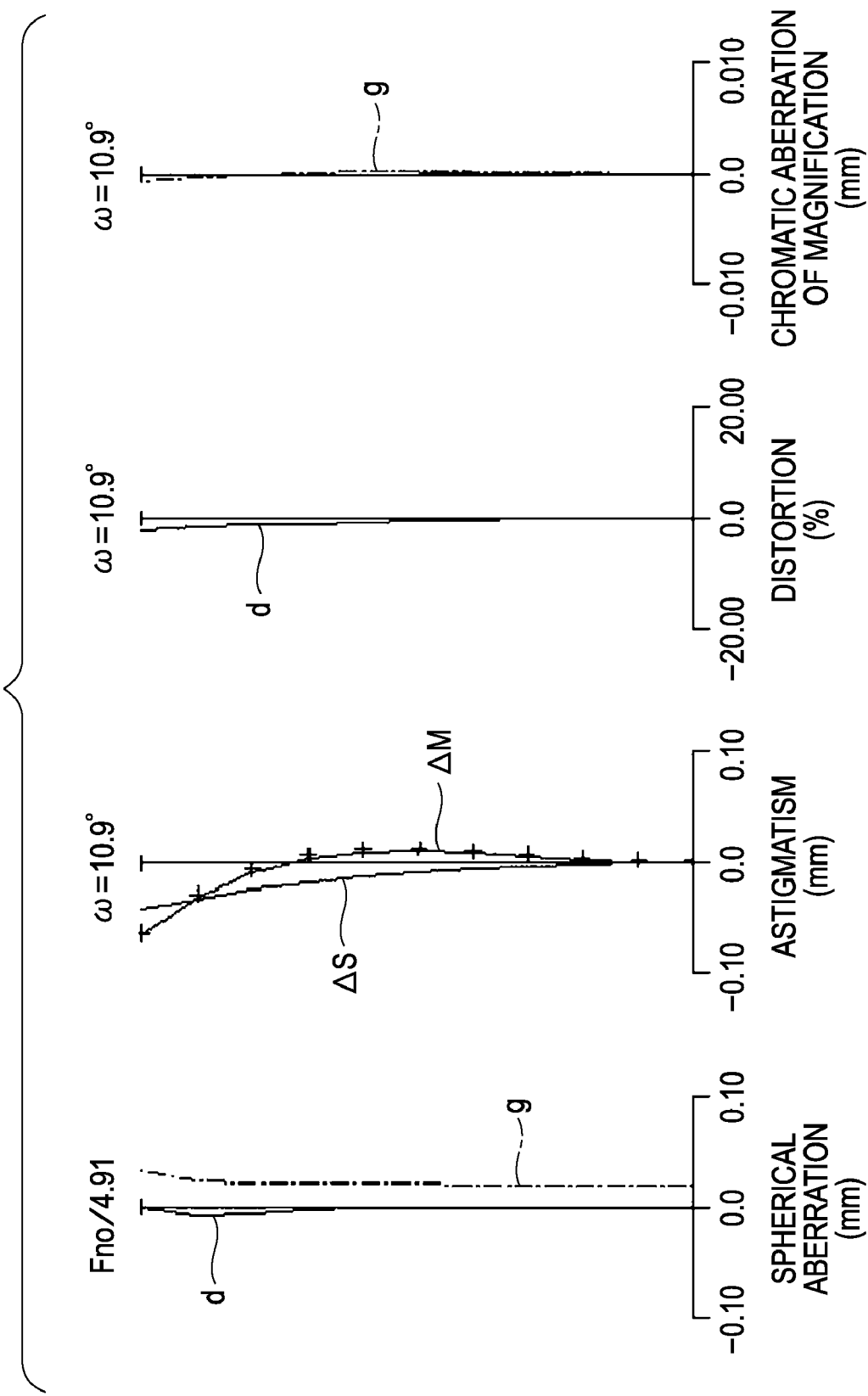
FIG. 12 illustrates aberration diagrams of the zoom lens according to the third embodiment at the telephoto end.

FIG. 9 is a sectional view of a zoom lens according to a third embodiment of the present invention. FIGS. 10 to 12 illustrate aberration diagrams of the zoom lens according to the third embodiment at the wide-angle end, an intermediate zooming position, and the telephoto end, respectively, when an object at infinity is in focus.

Figure 13:
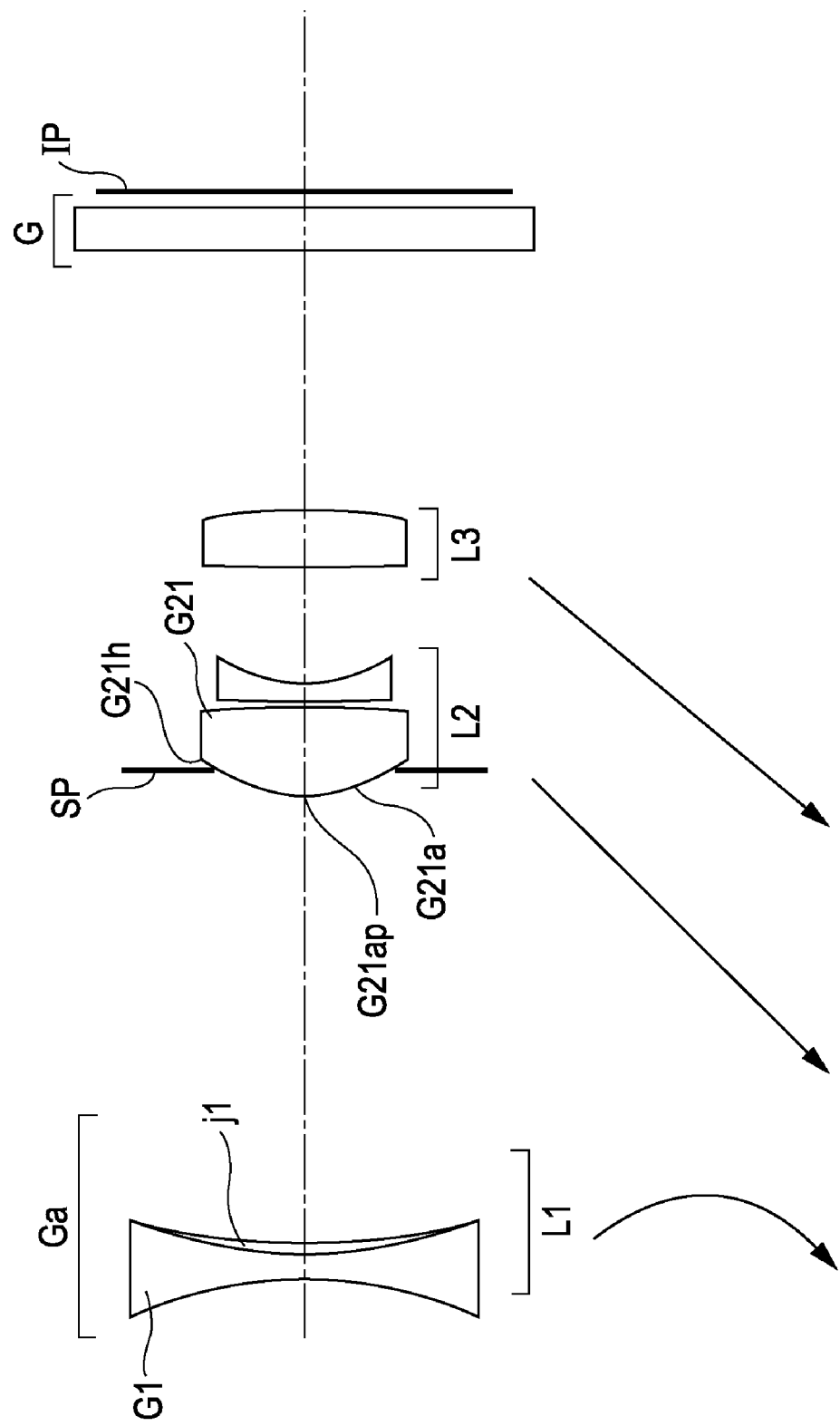
FIG. 13 is an optical sectional view of a zoom lens according to a fourth embodiment.
Figure 14:
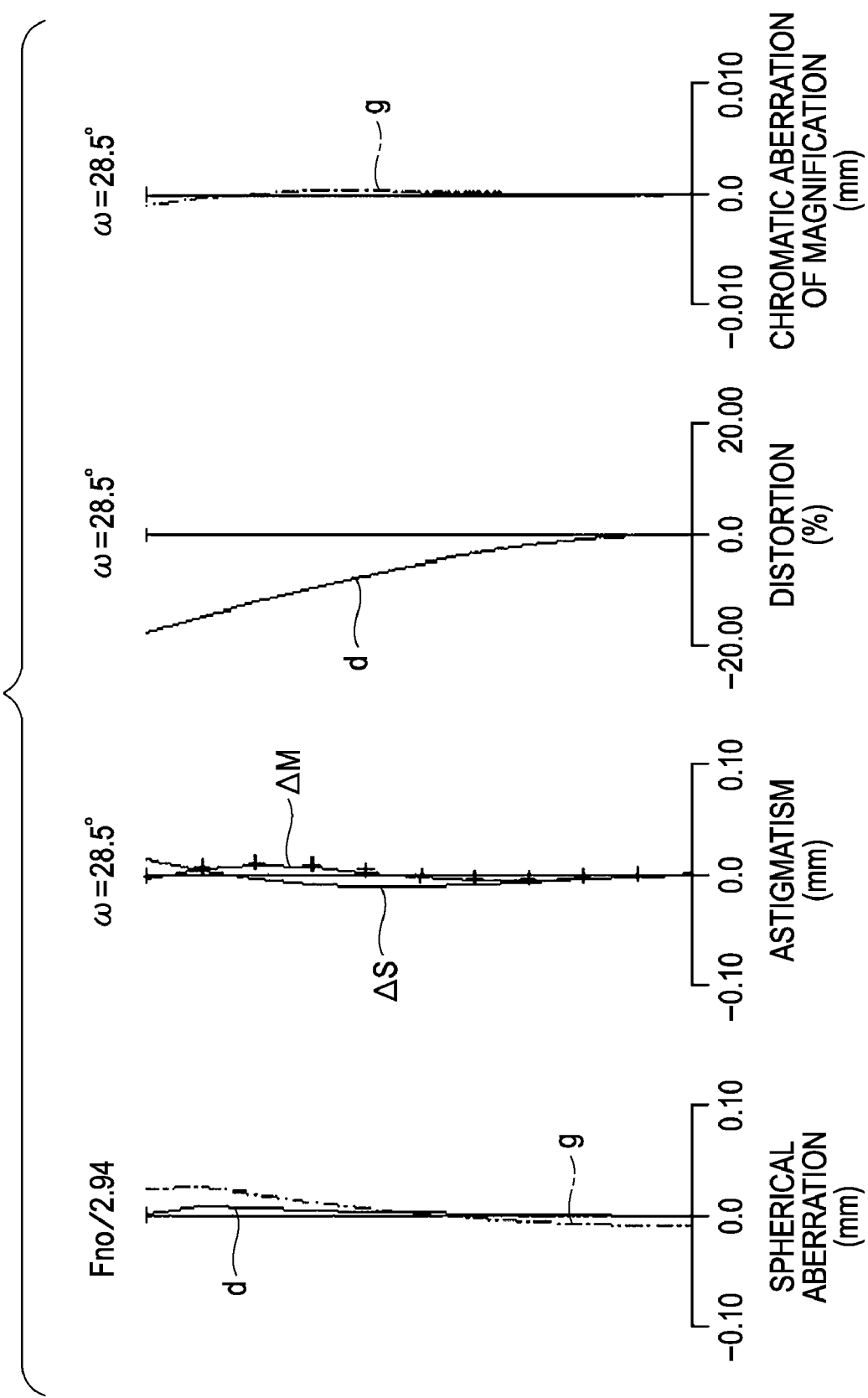
FIG. 14 illustrates aberration diagrams of the zoom lens according to the fourth embodiment at the wide-angle end.
Figure 15:
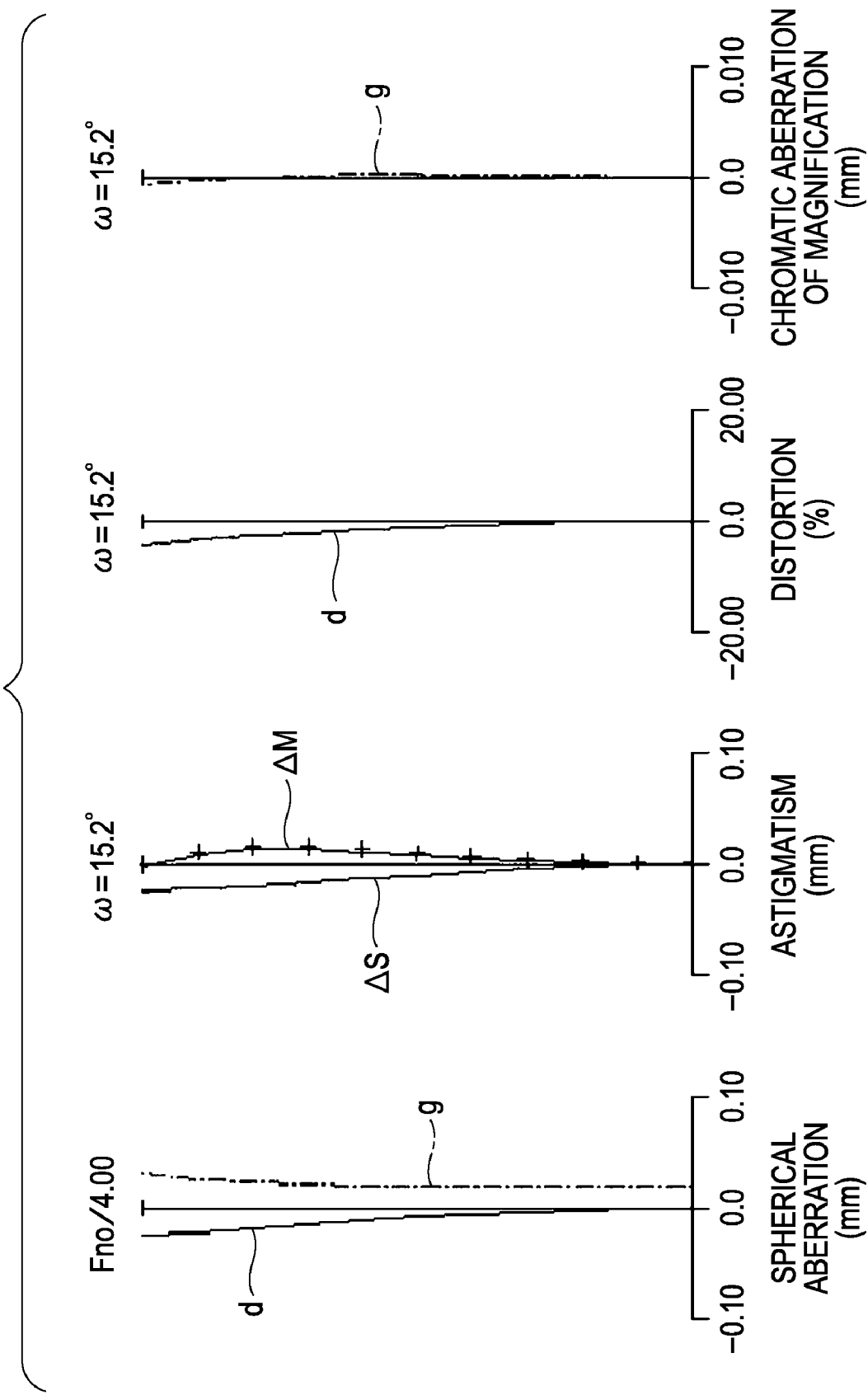
FIG. 15 illustrates aberration diagrams of the zoom lens according to the fourth embodiment at an intermediate zooming position.
Figure 16:
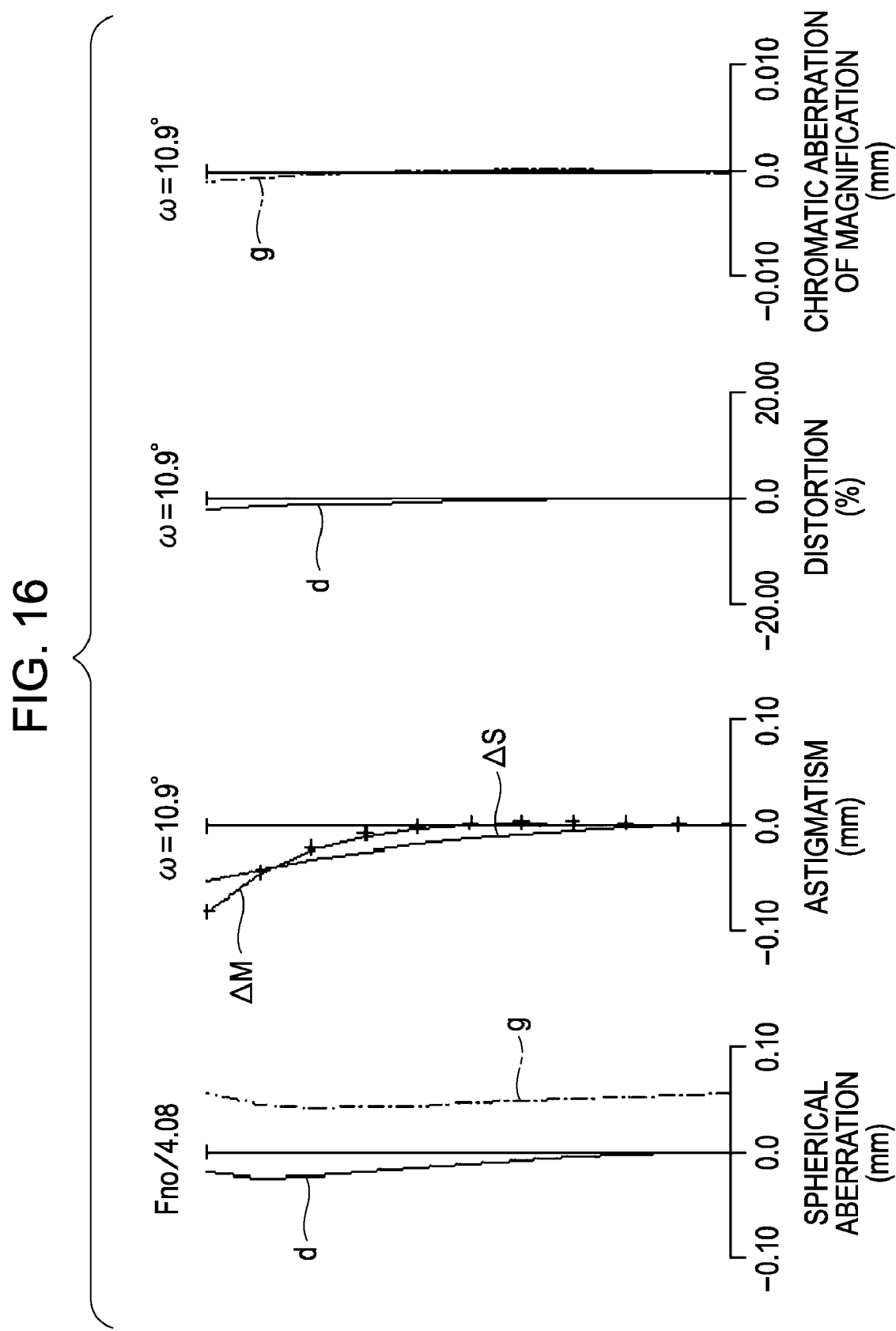
FIG. 16 illustrates aberration diagrams of the zoom lens according to the fourth embodiment at the telephoto end.

FIG. 13 is a sectional view of a zoom lens according to a fourth embodiment of the present invention. FIGS. 14 to 16 illustrate aberration diagrams of the zoom lens according to the fourth embodiment at the wide-angle end, an intermediate zooming position, and the telephoto end, respectively, when an object at infinity is in focus.

Figure 17:
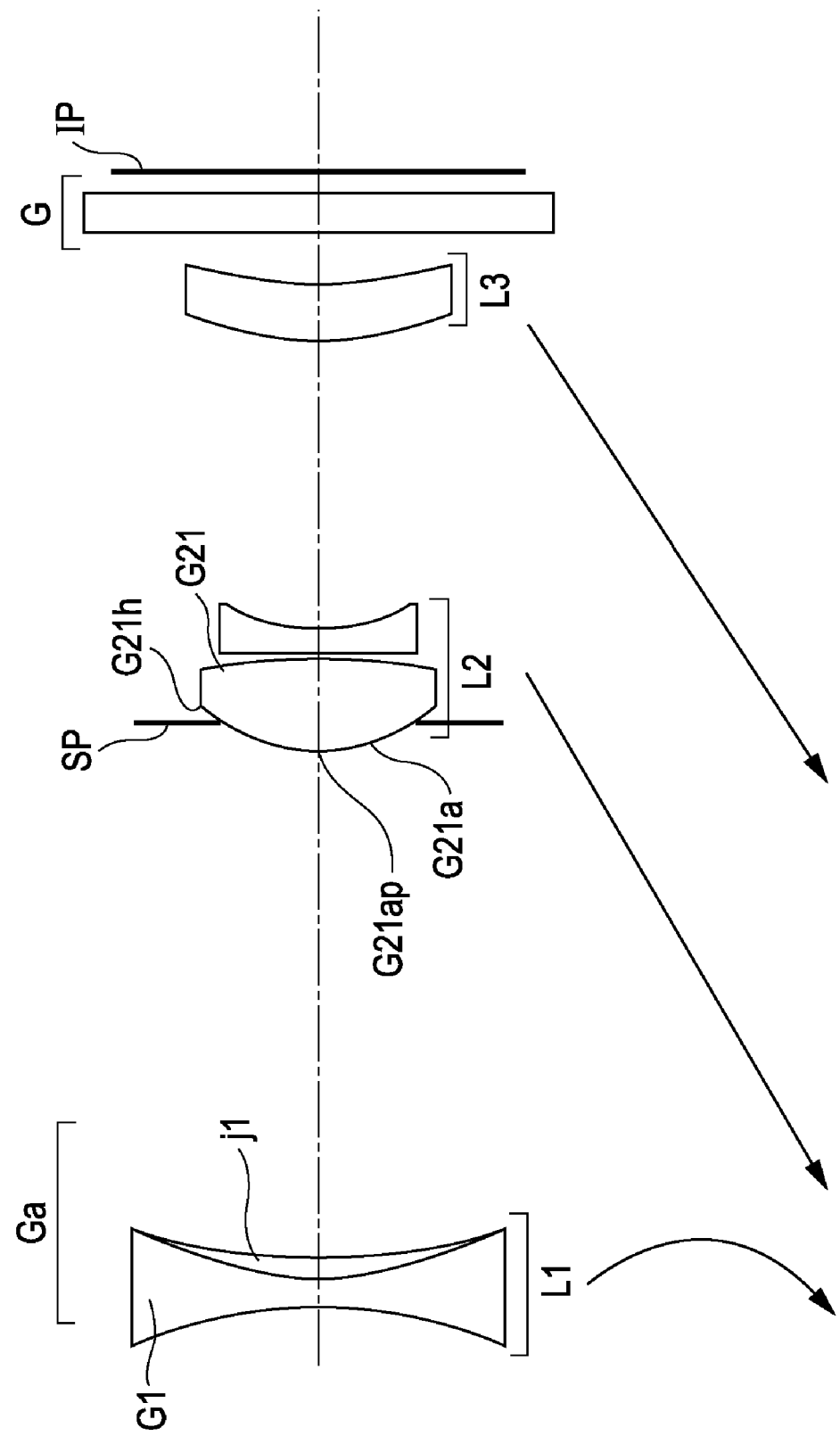
FIG. 17 is an optical sectional view of a zoom lens according to a fifth embodiment.
Figure 18:
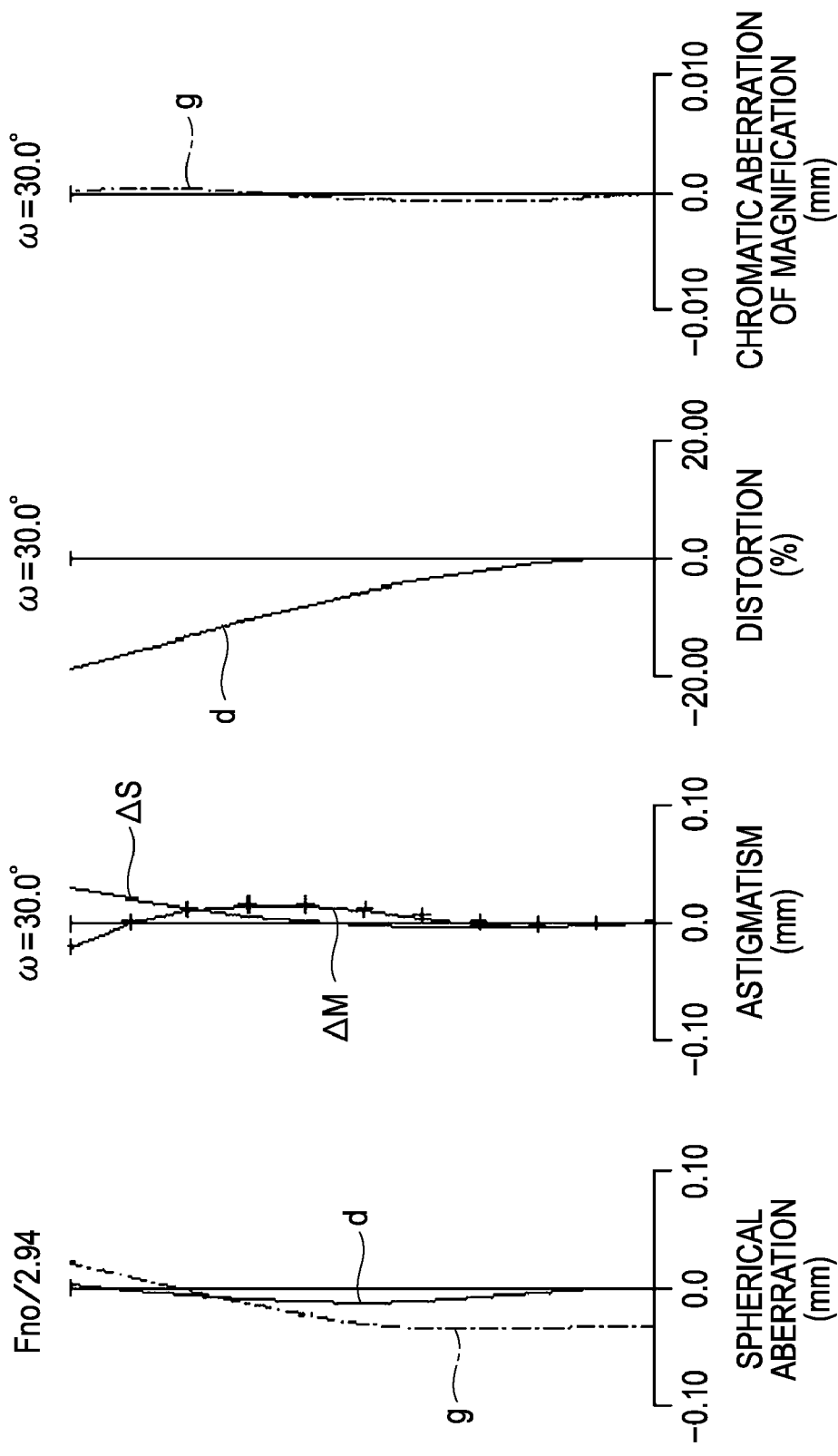
FIG. 18 illustrates aberration diagrams of the zoom lens according to the fifth embodiment at the wide-angle end.
Figure 19:
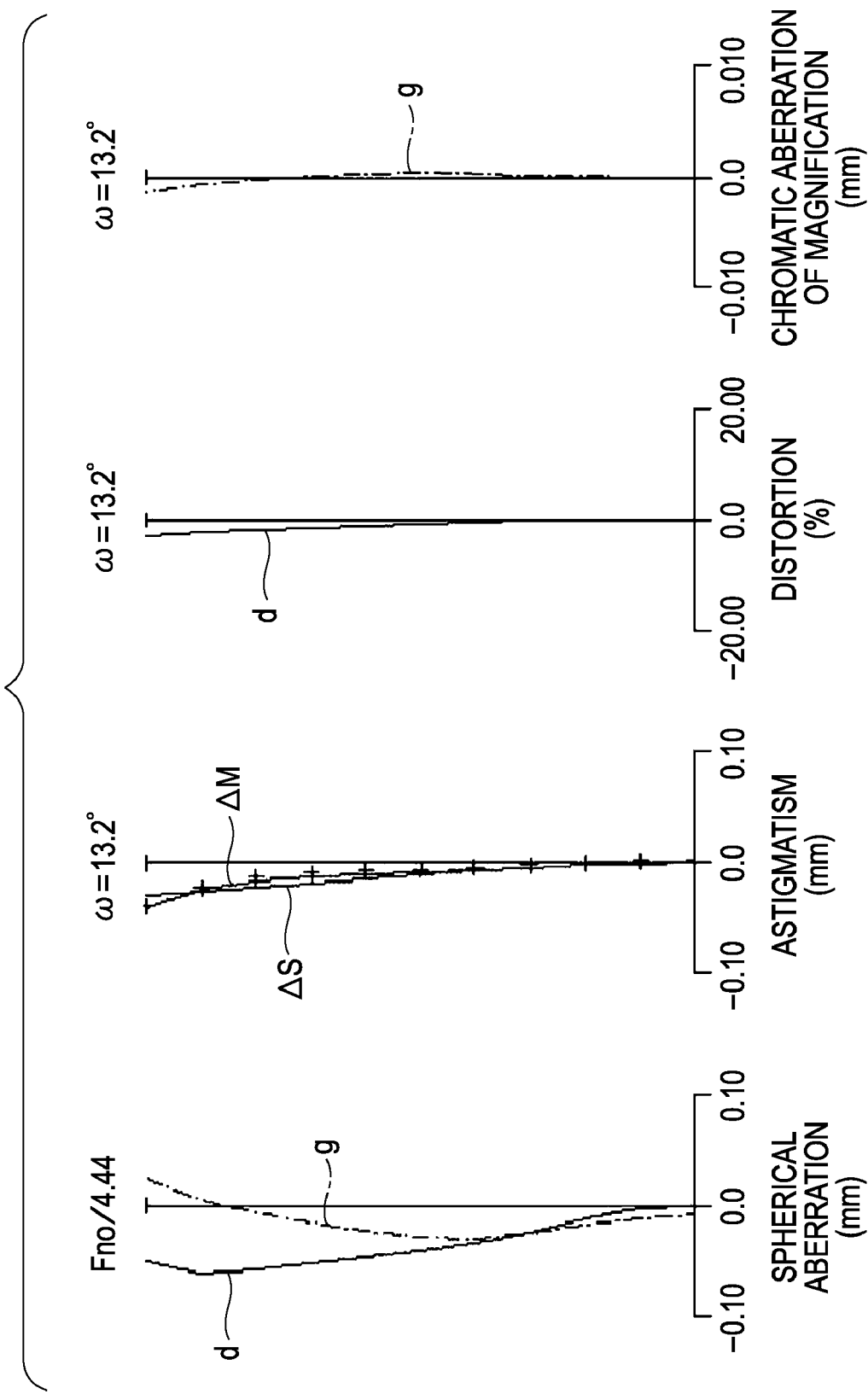
FIG. 19 illustrates aberration diagrams of the zoom lens according to the fifth embodiment at an intermediate zooming position.
Figure 20:
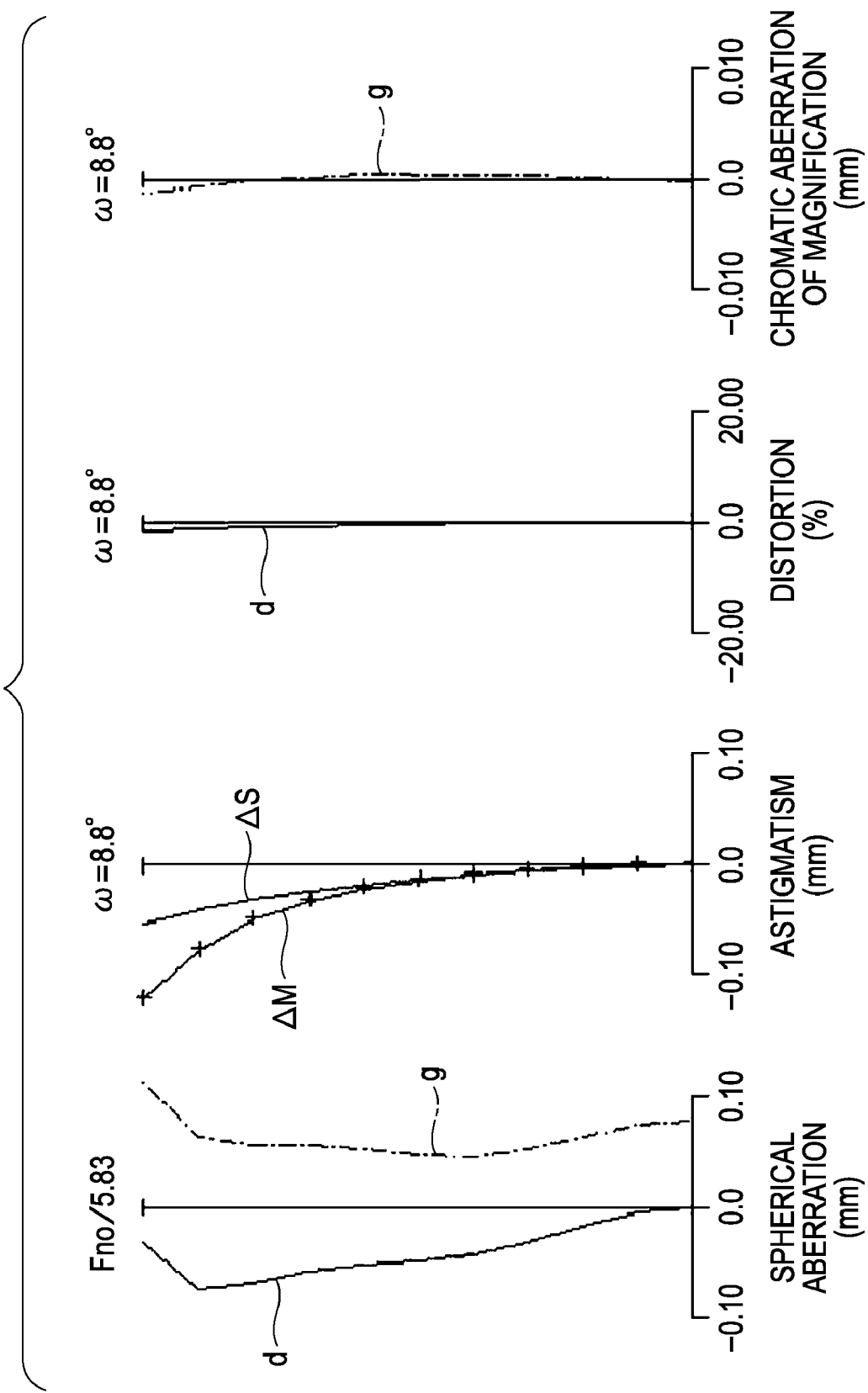
FIG. 20 illustrates aberration diagrams of the zoom lens according to the fifth embodiment at the telephoto end.

FIG. 17 is a sectional view of a zoom lens according to a fifth embodiment of the present invention. FIGS. 18 to 20 illustrate aberration diagrams of the zoom lens according to the fifth embodiment at the wide-angle end, an intermediate zooming position, and the telephoto end, respectively, when an object at infinity is in focus.

Figure 21:
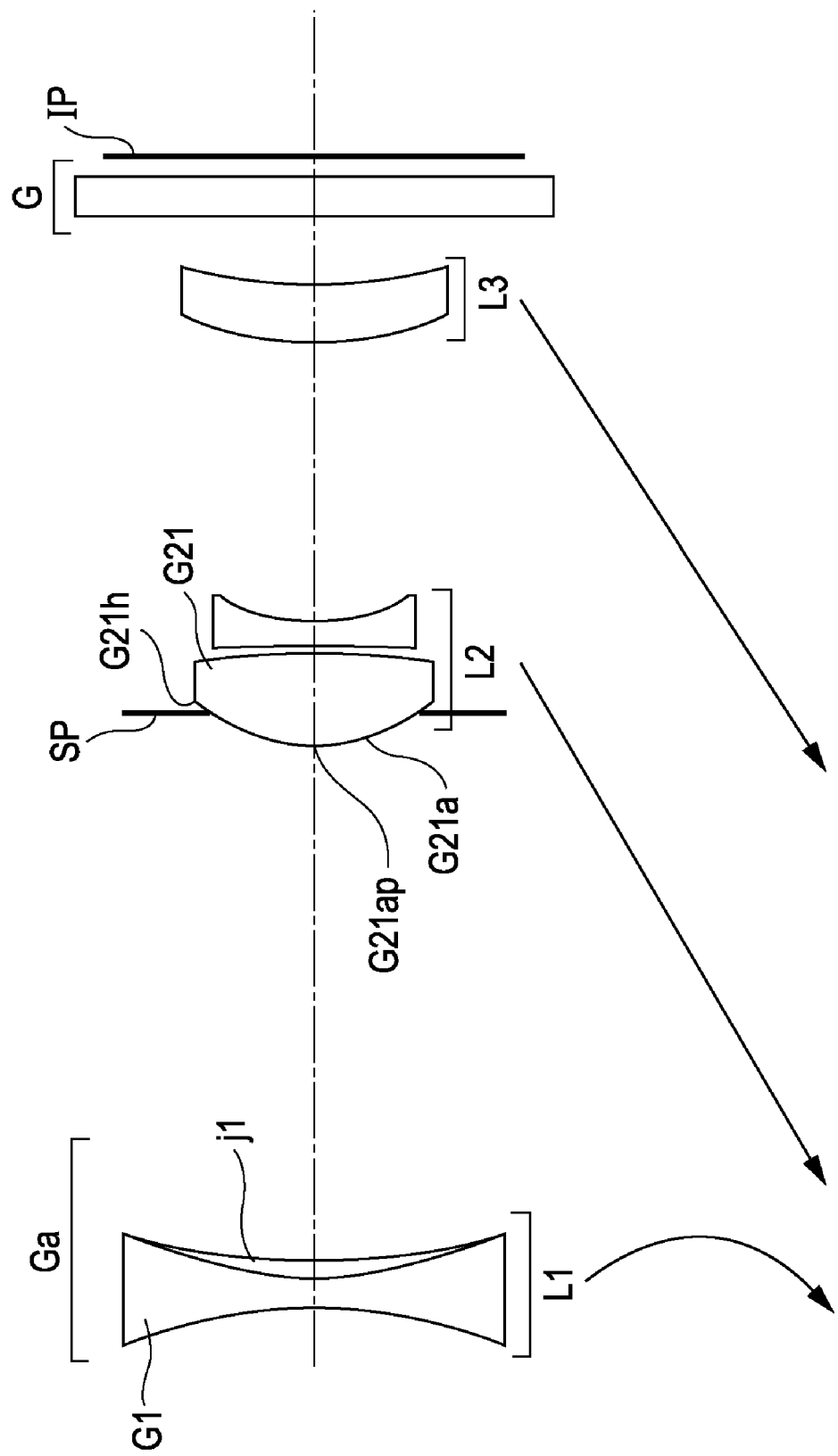
FIG. 21 is an optical sectional view of a zoom lens according to a sixth embodiment.
Figure 22:
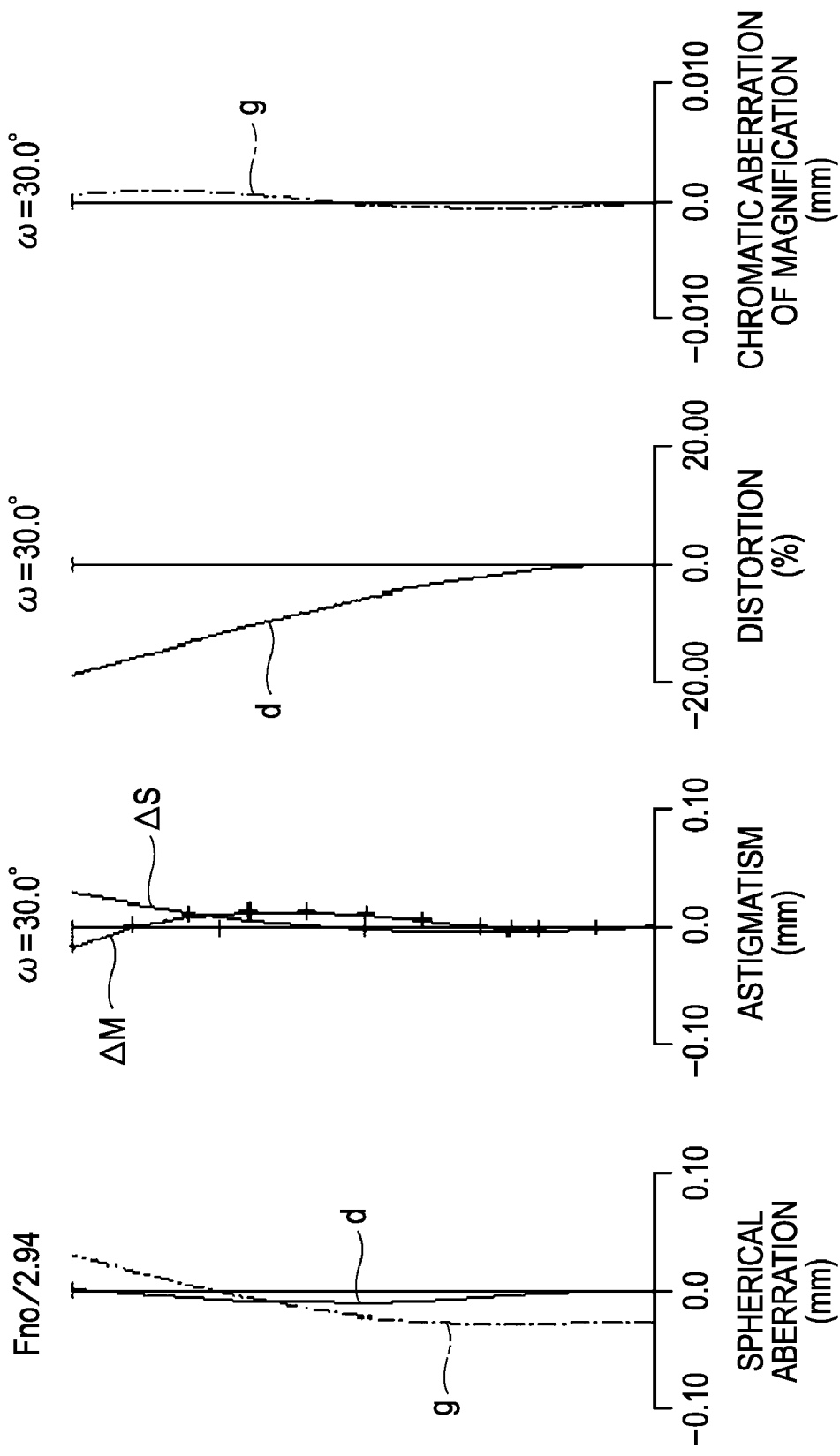
FIG. 22 illustrates aberration diagrams of the zoom lens according to the sixth embodiment at the wide-angle end.
Figure 23:
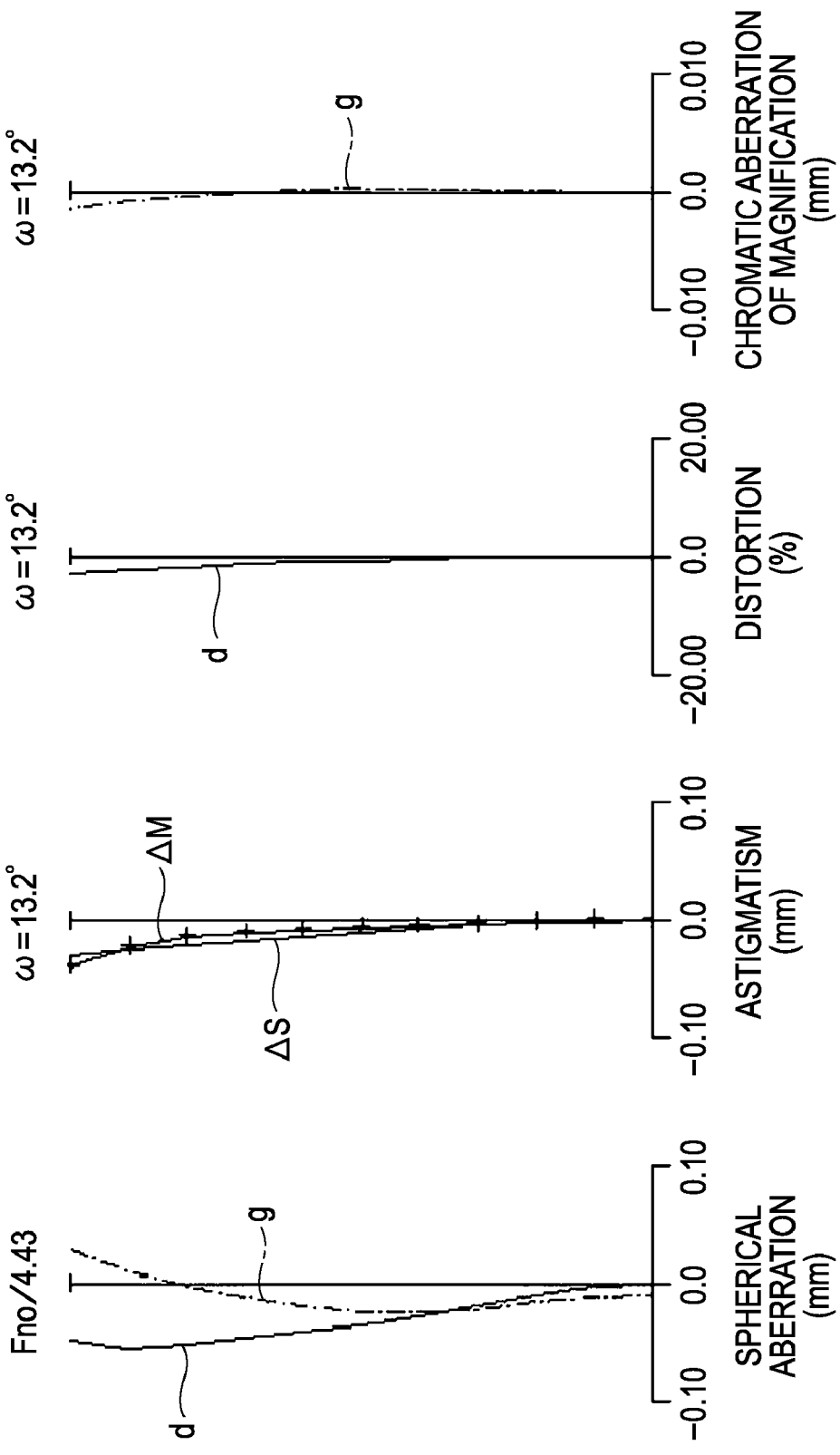
FIG. 23 illustrates aberration diagrams of the zoom lens according to the sixth embodiment at an intermediate zooming position.
Figure 24:
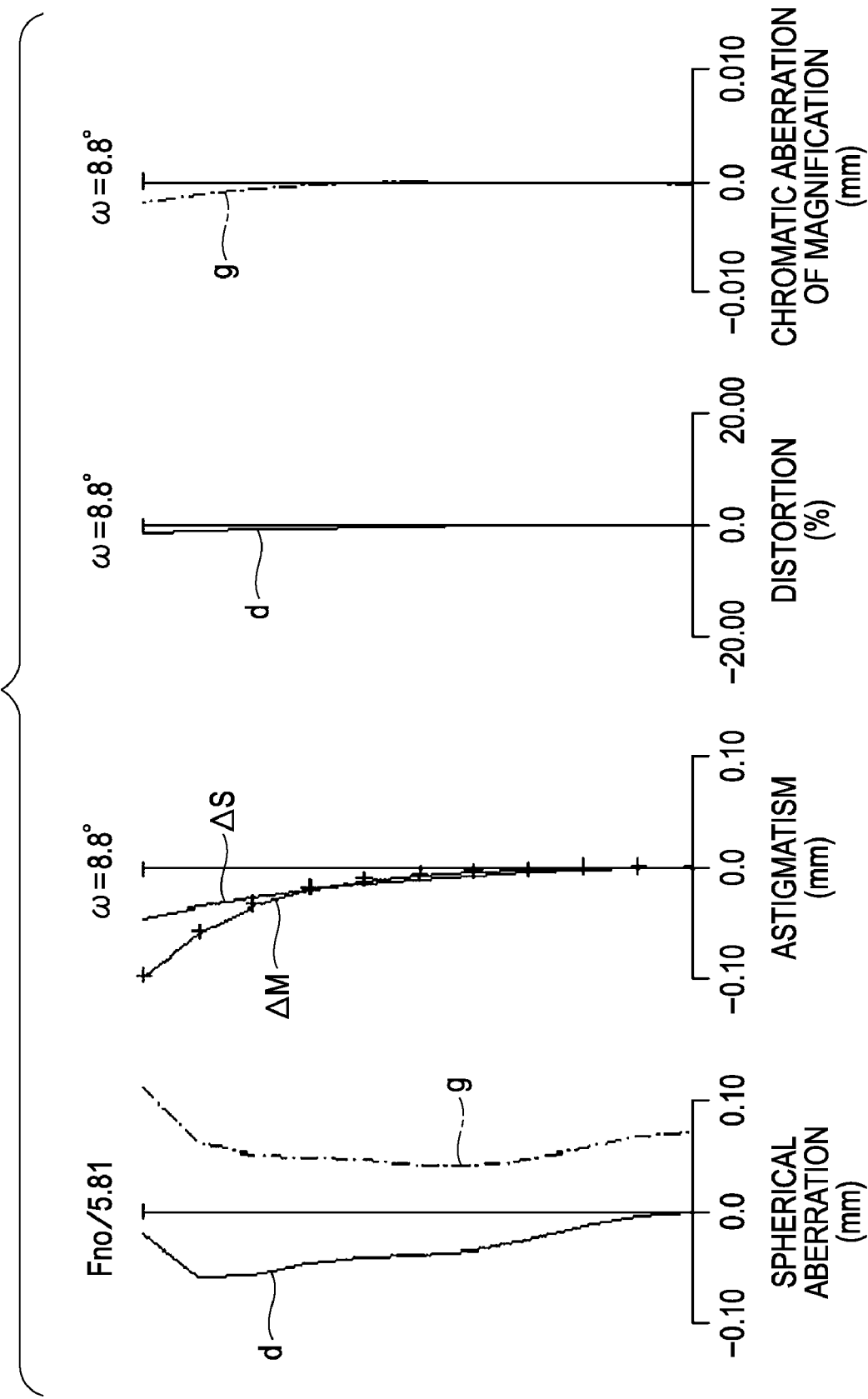
FIG. 24 illustrates aberration diagrams of the zoom lens according to the sixth embodiment at the telephoto end.
Figure 25:
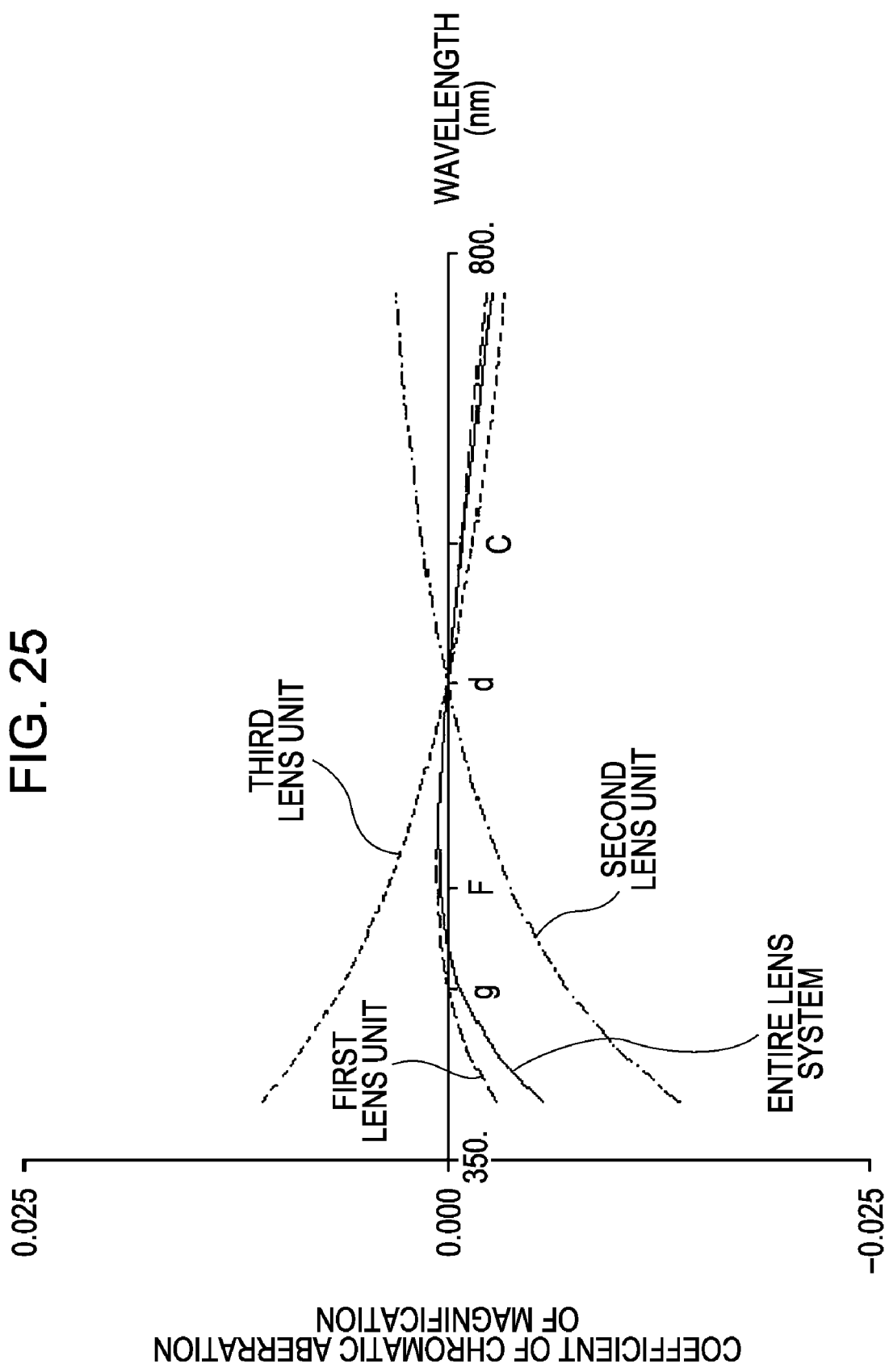
FIG. 25 is a graph showing the coefficient of chromatic aberration of magnification of a three-unit zoom lens including a lens unit having a negative refractive power, a lens unit having a positive refractive power, and a lens unit having a positive refractive power at the wide-angle end.

FIG. 21 is a sectional view of a zoom lens according to a sixth embodiment of the present invention. FIGS. 22 to 24 illustrate aberration diagrams of the zoom lens according to the sixth embodiment at the wide-angle end, an intermediate zooming position, and the telephoto end, respectively, when an object at infinity is in focus. FIG. 25 is a schematic diagram illustrating the main part of an image-pickup apparatus according to an embodiment of a present invention.

In the sectional views shown in FIGS. 1, 5, 9, 13, 17, and 21, the left side shows the object side (front side, magnifying side) and the right side shows the image side (rear side, reducing side).

In the sectional views, G1 denotes a lens element and j1 denotes a resin layer, which will be described below. Ga denotes a compound optical element including the lens element G1 and the resin layer j1. L1 denotes a first lens unit having a negative refractive power (optical power is the reciprocal of focal length), L2 denotes a second lens unit having a positive refractive power, and L3 denotes a third lens unit having a positive refractive power.

SP denotes an aperture stop. IP denotes an image plane. In the case where the zoom lens is used as an imaging optical system of a video camera or a digital still camera, an image pickup plane of a solid-state image pickup element (photoelectric conversion element), such as a CCD sensor and a CMOS sensor, corresponds to the image plane IP. In the case where the zoom lens is used in a silver-halide film camera, a film surface corresponds to the image plane IP.

G denotes an optical block corresponding to, for example, an insertion filter, an optical low-pass filter, and an infrared-cut filter.

In FIGS. 2 to 4, FIGS. 6 to 8, FIGS. 10 to 12, FIGS. 14 to 16, FIGS. 18 to 20, and FIGS. 22 to 24, d and g denote d-line and g-line, respectively. ΔM and ΔS denote a meridional image plane and a sagittal image plane, respectively, for the d-line. With regard to the chromatic aberration of magnification, the chromatic aberration of magnification for the g-line is shown. In addition, Fno denotes the F-number and ω denotes a half field angle (degree).

In each embodiment, the first lens unit L1 includes the compound optical element Ga including the lens element G1 and the resin layer j1 laminated on the lens element G1. The optical characteristics of the resin layer j1 differ from those of the lens element G1. In the case where, for example, the resin layer j1 is formed of curable resin that can be cured by applying light or heat, the resin layer j1 is generally formed by photopolymerization or thermal polymerization.

Therefore, when a mold having an aspherical surface is used, a surface of the resin layer j1 on the side opposite to the boundary between the resin layer j1 and the lens element G1 can be relatively easily formed in an aspherical shape.

In the optical system of each embodiment, the zoom lens includes three lens units, which are a first lens unit L1 having a negative refractive power, a second lens unit L2 having a positive refractive power, and a third lens unit L3 having a positive refractive power, arranged in order from the object side to the image side.

During zooming from the wide-angle end to the telephoto end, the first lens unit L1 moves along a locus that is convex toward the image side, as shown by the arrow. More specifically, the first lens unit L1 moves toward the image side, and then moves toward the object side. The second lens unit L2 and the third lens unit L3 move toward the object side. In the zoom lens of each embodiment, the magnification is mainly changed by the movement of the second lens unit L2, and the movement of the image point due to the change in the magnification is corrected by the movement of the first lens unit L1 and the third lens unit L3.

In each embodiment, the first lens unit L1 includes the compound optical element Ga including the biconcave negative lens (lens element) G1 and the resin layer j1 laminated on the image-side surface of the lens element G1. In addition, the second lens unit L2 includes two lenses, which are a biconvex positive lens and a meniscus negative lens having a convex surface on the object side, arranged in order from the object side to the image side.

In first to fourth numerical examples, the third lens unit L3 includes a single biconvex positive lens. In fifth and sixth numerical examples, the third lens unit L3 includes a single meniscus positive lens having a convex surface on the object side.

An aperture stop SP, which functions as a stop member, is positioned between an object-side vertex G21ap of an object-side lens surface G21a of a lens G21 that is closest to the object side in the second lens unit L2 and an intersection point G21h between the object-side lens surface G21a of the lens G21 and the outer peripheral edge of the lens G21. Thus, no element is disposed between the first lens unit L1 and the second lens unit L2. Therefore, the distance between the first lens unit L1 and the second lens unit L2 can be easily minimized in the retracted state.

In each embodiment, the wide-angle end and the telephoto end are zooming positions corresponding to the states in which the magnification-varying lens unit is at one and other ends of a mechanically moveable range along an optical axis.

In each embodiment, the third lens unit L3 can be integrated with the second lens unit L2 and be moved together with the second lens unit L2 during zooming.

In such a case, the zoom lens according to each embodiment can be considered as a two-unit zoom lens.

The zoom lens may also be structured as a zoom lens including four or more lens units in total by placing one or more lens units having refractive powers on the image side of the third lens unit L3.

In each embodiment, νdg denotes an Abbe number of a material of the lens element G1 included in the first lens unit L1. In addition, νdj and ΔθgFj denote an Abbe number and an anomalous partial dispersion ratio, respectively, of a material of the resin layer j1. Here, the following conditions are satisfied:

$$31 < |\nu dg - \nu dj| \quad (1)$$

$$26 > \nu dj \quad (2)$$

$$0.10 > |\Delta\theta Fj| \quad (3)$$

The Abbe number νd, the partial dispersion ratio θgF, and the anomalous partial dispersion ratio (anomalous partial dispersibility) ΔθgF are defined as follows.

That is, when the refractive indices of a material for the g-line (wavelength 435.8 nm), the F-line (486.1 nm), the d-line (587.6 nm), and the C-line (656.3 nm) are Ng, NF, Nd and NC, respectively, νd, θgF, and ΔθgF are obtained as follows:

$$\nu d = (Nd-1)/(NF-NC)$$

$$\theta gF = (Ng-NF)/(NF-NC)$$

$$\Delta\theta gF = \theta gF - (0.6438 - 0.001682 \times \nu d) \quad (a)$$

The lens element is an optical element like a glass lens or a plastic lens which can serve as a substrate on which a resin layer can be laminated. The resin layer to be laminated on the lens element may be formed in advance, as long as the resin layer has optical characteristics different from those of the lens element.

The technical meaning of each of the conditional expressions will now be described.

Conditional Expression (1) relates to the difference between the Abbe numbers of the lens element G1 and the resin layer j1. If the value of Conditional Expression (1) is less than the lower limit thereof, sufficient difference in Abbe number cannot be obtained and the chromatic aberrations in the first lens unit L1 cannot be sufficiently corrected.

The numerical range of Conditional Expression (1) can also be set as follows:

$$35 < |\nu dg - \nu dj| \quad (1a)$$

In such a case, the chromatic aberrations can be more easily corrected.

Conditional Expression (2) relates to the Abbe number of the material of the resin layer j1. If the value (absolute value) of the Abbe number is small, that is, if the dispersion is large, it is easy to correct the chromatic aberrations independently.

More specifically, as an example, the axial chromatic aberration and the chromatic aberration of magnification on a lens surface will be described.

When Δψ is a change in power of a refractive lens surface and ν is an Abbe number of a material of the lens surface, a change ΔL in the coefficient of axial chromatic aberration and a change ΔT in the coefficient of chromatic aberration of magnification on the lens surface can be expressed as follows:

$$\Delta L \propto \Delta\psi/\nu \quad (b)$$

$$\Delta T \propto \Delta\psi/\nu \quad (c)$$

As is clear from Expressions (b) and (c), the changes ΔL and ΔT in the coefficients of the respective aberrations relative to the change $\Delta\psi$ in the power of the lens surface increases as the value of the Abbe number $\nu$ decreases (i.e., as the dispersion increases).

Therefore, the change $\Delta\psi$ in the power for obtaining necessary chromatic aberrations can be reduced when a material with a small Abbe number $\nu$ and large dispersion is used.

This means that, in aberration theory, the chromatic aberrations can be controlled without largely influencing the spherical aberration, the coma aberration, the astigmatism, etc., and that the independency of the chromatic aberrations can be increased.

Conversely, when a material having small dispersion (large Abbe number $\nu$) is used, the change $\Delta\psi$ in the power for obtaining necessary chromatic aberrations increases. Accordingly, various aberrations, such as the spherical aberration, increase and the independency of the chromatic aberrations decreases. Therefore, in view of the correction of aberrations, it is important that at least one lens surface of lenses included in the optical system is a surface of a refractive lens that is made of a high-dispersion maternal.

If the value of the Abbe number $\nu$ is small, the power required for establishing the relationship for cancelling the chromatic aberrations of the lens element in the first lens unit L1 is also small. It is advantageous that the power be small in view of the aberration theory. In addition, the maximum thickness of the resin layer j1 can be reduced. Thus, the thickness of the first lens unit L1 can be reduced, and the size of the optical system can be reduced as a result.

The numerical value of Conditional Expression (2) can also be set as follows:

$$24 > \nu dj \quad (2a)$$

In such a case, the chromatic aberrations can be more easily corrected.

The numerical value of Conditional Expression (2a) can also be set as follows:

$$22 > \nu dj \quad (2b)$$

Conditional Expression (3) relates to the anomalous partial dispersion ratio of the material of the resin layer j1. If the value of Conditional Expression (3) is greater than the upper limit thereof, it is difficult to correct the chromatic aberrations over the entire zooming range from the wide-angle end to the telephoto end.

The reason for this will be described using an example of the coefficient of chromatic aberration of magnification at the wide-angle end and the coefficient of axial chromatic aberration at the telephoto end in a three-unit zoom lens including a first lens unit having a negative refractive power, a second lens unit having a positive refractive power, and a third lens unit having a positive refractive power.

FIG. 25 shows the variation in the coefficient of chromatic aberration of magnification at the wide-angle end relative to the wavelength in each lens unit of the zoom lens.

For the first lens unit L1 and the second lens unit L2, the coefficient of chromatic aberration of magnification varies along upwardly convex curves. For the third lens unit L3, the coefficient of chromatic aberration of magnification varies along a downwardly convex curve. For the entire optical system, the coefficient varies along a downwardly convex curve.

Figure 26:
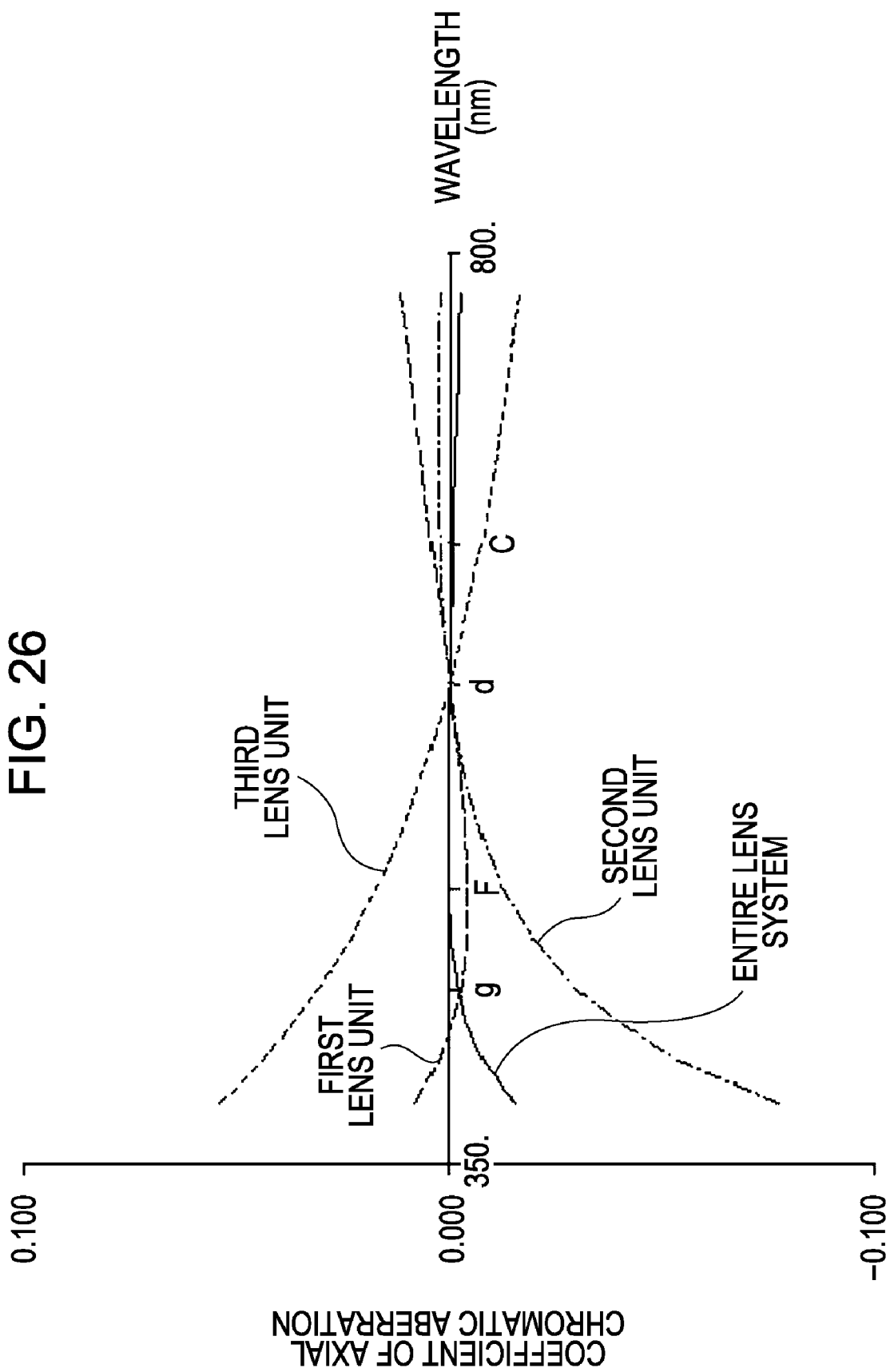
FIG. 26 is a graph showing the coefficient of axial chromatic aberration of a three-unit zoom lens including a lens unit having a negative refractive power, a lens unit having a positive refractive power, and a lens unit having a positive refractive power at the telephoto end.

Similarly, FIG. 26 shows the variation in the coefficient of axial chromatic aberration at the telephoto end relative to the wavelength. For the first lens unit L1 and the third lens unit L3, the coefficient of axial chromatic aberration varies along downwardly convex curves. For the second lens unit L2, the coefficient of axial chromatic aberration varies along an upwardly convex curve. For the entire optical system, the coefficient of axial chromatic aberration varies along an upwardly convex curve.

The chromatic aberrations of the entire optical system can be adequately corrected by reducing the curvature of the curve in the short wavelength range so as to increase the linearity thereof and rotating the curve around the d-line.

The wavelength characteristics of the coefficients of chromatic aberrations of the first lens unit L1 will be discussed. Referring to FIG. 25, the coefficient of chromatic aberration of magnification at the wide-angle end varies along the upwardly convex curve. In a short wavelength range, the curvature of the curve for the first lens unit L1 is similar to the curvature of the curve for the entire system. Therefore, when the curvature of the curve for the first lens unit L1 can be reduced, the chromatic aberration of magnification of the entire system at the wide-angle end can be adequately corrected. However, as shown in FIG. 26, with regard to the coefficient of axial chromatic aberration at the telephoto end, the curve for the first lens unit L1 is downwardly convex, and is curved in a direction different from that of the curve for the entire system. Therefore, when the curvature of the curve for the first lens unit L1 is reduced, the axial chromatic aberration of the entire system increases.

The anomalous partial dispersion ratio $\Delta\theta gF$ of a material shows the curvature in the short wavelength range of the chromatic aberrations generated when the refractive power is applied to the material. When the value of the anomalous partial dispersion ratio $\Delta\theta gF$ is large, the curvature in the short wavelength range is large. When the value of the anomalous partial dispersion ratio $\Delta\theta gF$ is small, the curvature in the short wavelength range is small.

In the zoom lens of each embodiment, the above-described conflicting relationship between the correction of chromatic aberration of magnification at the wide-angle end and the correction of axial chromatic aberration at the telephoto end also applies to the chromatic aberrations generated by the resin layer j1 included in the first lens unit L1 having a negative refractive power.

More specifically, although the chromatic aberration of magnification at the wide-angle end can be adequately corrected by reducing the value of the anomalous partial dispersion ratio $\Delta\theta gF$ of the resin layer j1, the axial chromatic aberration at the telephoto end increases in such a case. Conversely, although the chromatic aberration of magnification at the wide-angle end increases when the value of the anomalous partial dispersion ratio $\Delta\theta gF$ of the resin layer j1 is increased, the axial chromatic aberration at the telephoto end can be adequately corrected in such a case.

Therefore, the anomalous partial dispersion ratio $\Delta\theta gF$ of the resin layer j1 must not be too large or too small.

For this reason, Conditional Expression (3) is set to adequately correct the chromatic aberrations over the entire zooming range from the wide-angle end to the telephoto end.

As described above, according to each embodiment, a high-zoom-ratio, wide-field-angle zoom lens which includes a small number of lenses (four lenses), which adequately corrects various aberrations including the chromatic aberrations, and which is suitable for use as a retractable lens can be obtained.

In the zoom lens of each embodiment, to obtain higher optical performance and to reduce the overall size of the lens system, one or more of the following conditions can be satisfied. In such a case, effects corresponding to the conditions can be obtained.

In a zoom-type zoom lens including a first lens unit having a negative refractive power and a second lens unit having a positive refractive power in order from the object side to the image side, it is more advantageous to reduce the chromatic aberration of magnification at the wide-angle end rather than reducing the axial chromatic aberration at the telephoto end. However, since the partial dispersion ratio θgF of a normal glass material has a limited range, there may be a case where it is difficult to adequately correct the chromatic aberrations over the entire wavelength range with a small number of lenses.

Accordingly, the anomalous partial dispersion ratio ΔθgFj of the material forming the resin layer j1 can satisfy the following condition:

$$-0.10 < \Delta\theta gFj < 0.038 \qquad (4)$$

In such a case, the chromatic aberration of magnification at the wide-angle end can be easily corrected.

The numerical range of Conditional Expression (4) can also be set as follows:

$$-0.10 < \Delta\theta gFj < 0.01 \qquad (4a)$$

In such a case, the chromatic aberration of magnification at the wide-angle end can be easily corrected. The numerical range of Conditional Expression (4a) can also be set as follows:

$$-0.05 < \Delta\theta gFj < 0.00 \qquad (4b)$$

A resin or a compound in which inorganic oxide nanoparticles are dispersed into a synthetic resin is an example of a material that satisfies Conditional Expressions (2), (3), and (4).

There are various kinds of resins that satisfy Conditional Expressions (2) and (3). In particular, UV-curable resin (Nd=1.635, νd=22.7, θgF=0.69) and N-polyvinylcarbazole (Nd=1.696, νd=17.7, θgF=0.69) satisfy Conditional Expressions (2) and (3). In addition, fluorene-based UV-curable resin (Nd=1.625, νd=25.2, θgF=0.63) satisfies Conditional Expressions (2), (3), and (4).

In each embodiment, the material is not particularly limited as long as Conditional Expressions (2), (3), and (4) can be satisfied.

As an example of an optical material having optical characteristics different from those of common resin, a compound in which inorganic oxide nanoparticles are dispersed into a synthetic resin can be used.

The inorganic oxide nanoparticles are, for example, $TiO_2$ (Nd=2.757, νd=9.53), $Nb_2O_5$ (Nd=2.367, νd=14.0), or ITO (Nd=1.8581, νd=5.53).

In addition, $Cr_2O_3$ (Nd=2.2178, νd=13.4) and $BaTiO_2$ (Nd=2.4362, νd=11.3) are also inorganic oxides.

Among the inorganic oxides, when, for example, particles of ITO (Nd=1.8581, νd=5.53, θgF=0.29) are dispersed in the synthetic resin at an adequate volume ratio, an optical material that satisfies Conditional Expressions (2), (3), and (4) can be obtained.

ITO is a material used for forming transparent electrodes, and is generally used in a liquid crystal display element or an EL element. In addition, ITO is also used in an infrared-ray blocking element or an ultraviolet-ray blocking element.

In each embodiment, the average diameter of the $ITO_2$ particles dispersed in the resin can be set to about 2 nm to 50 nm when the influence of scattering is taken into account, and dispersant can be used to suppress aggregation.

Polymer can be used as the medium into which the $ITO_2$ particles are dispersed, and high mass productivity can be obtained by forming the resin layer by photopolymerization or thermal polymerization using a forming die.

In addition, with regard to the characteristics of optical constant of the polymer, a polymer with a relatively high partial dispersion ratio, a polymer with a relatively low Abbe number, or a polymer with both a relatively high partial dispersion ratio and a relatively low Abbe number can be used. For example, N-polyvinylcarbazole, styrene, polymethylmethacrylate(acryl), or other polymers as known by one of ordinary skill can be used. In the embodiments described below, fluorene-based UV-curable resin and N-polyvinylcarbazole are used as host polymers in which the ITO particles are dispersed. However, in each embodiment, the material is not limited to the above-mentioned optical materials.

The dispersion characteristic N(λ) of the compound in which nanoparticles are dispersed can be easily calculated by the following equation, which is derived by the Drude equation, which is commonly known. More specifically, the refractive index N(λ) at a wavelength λ can be calculated as follows:

$$N(\lambda) = [1 + V\{N_{IT}^2(\lambda) - 1\} + (1-V)\{N_P^2(\lambda) - 1\}]^{1/2}$$

Here, λ is an arbitrary wavelength, $N_{IT}$ is the refractive index of ITO, $N_P$ is the refractive index of the polymer, V is the ratio of the total volume of the ITO particles with respect to the volume of the polymer.

When fg is a focal length of the lens element G1 in the air and fj is a focal length of the resin layer j1 in the air, the following condition can be satisfied:

$$fg/fj < 0 \qquad (5)$$

Conditional Expression (5) relates to the ratio of the focal length of the lens element G1 to the focal length of the resin layer j1, and is set so that the focal lengths of the lens element G1 and the resin layer j1 have opposite signs. When the value of Conditional Expression (5) is greater than the upper limit thereof, the focal lengths of the lens element G1 and the resin layer j1 have the same sign. In such a case, it is difficult to adequately correct the chromatic aberrations of the compound optical element by itself. Therefore, it is difficult to adequately correct not only the chromatic aberrations of the first lens unit L1 but also the chromatic aberrations of the entire system. The numerical value of Conditional Expression (5) can also be set as follows:

$$fg/fj < -0.1 \qquad (5a)$$

In each embodiment, at least one of the refractive surfaces of the lens element G1 has an aspherical shape. In such a case, the chromatic aberration flare, such as chromatic spherical aberration, can be adequately corrected.

In each embodiment, at least one of the refractive surfaces of the lens element G1 can have an aspherical shape. In such a case, the chromatic aberration flare, such as chromatic spherical aberration, can be adequately corrected.

In each embodiment, when the lens element G1 is formed by a known molding method using a glass material, the aspherical shape can be easily formed.

In each embodiment, an ultraviolet absorption film can be provided on the object side of the resin layer j1. When strong ultraviolet rays are incident on the resin layer, there is a risk that the shape and the optical characteristics of the resin layer will change and the optical performance thereof will be degraded.

Therefore, an ultraviolet cut film may be formed by deposition or an ultraviolet absorption film may be disposed on the object side of the resin layer j1. However, if an ultraviolet absorption filter is provided separately from the lens element G1 and positioned on the object side of the resin layer j1, the size of the entire system will be increased.

Even if a material that easily absorbs ultraviolet rays is used as the glass material for forming the lens element G1, the ultraviolet rays cannot be sufficiently absorbed unless the thickness of the lens element G1 is significantly large.

Therefore, to prevent the optical performance of the resin layer j1 from being degraded without increasing the size of the optical system, an ultraviolet absorption film can be provided on the object side of the resin layer j1.

In addition, in each embodiment, the resin layer j1 is positioned on the image side of the lens element G1. For the above-described reason, an ultraviolet absorption film (ultraviolet cut film) can be provided on the object side of the resin layer j1.

If the ultraviolet absorption film is formed by deposition on the surface of the resin layer j1, the surface temperature will increase to one hundred to two hundred degrees in the deposition process.

Therefore, the resin layer j1 can be positioned on the image side of the lens element G1 and the ultraviolet absorption film can be formed on the lens element G1 before the resin layer j1 is laminated thereon.

In the optical system of each embodiment, distortion can be corrected by known electrical aberration-correcting method.

The characteristics of the lens structure of each embodiment will now be described.

In a zoom lens according to a first numerical example shown in FIG. 1, the zoom ratio is 2.9 and Fno is about 2.9 to 5.4. The resin layer j1 in the first lens unit L1 according to the first numerical example is formed of UV-curable resin (Nd=1.635, vd=22.7, θgF=0.69). Thus, the chromatic aberrations are adequately corrected over the entire zooming range.

In a zoom lens according to a second numerical example shown in FIG. 5, the zoom ratio is 2.9 and Fno is about 2.9 to 5.4. The resin layer j1 in the first lens unit L1 according to the second numerical example is formed of fluorene-based UV-curable resin (Nd=1.625, vd=25.2, θgF=0.63). Thus, the chromatic aberrations are adequately corrected over the entire zooming range.

In a zoom lens according to a third numerical example shown in FIG. 9, the zoom ratio is 2.8 and Fno is about 2.9 to 4.9. The resin layer j1 in the first lens unit L1 according to the third numerical example is formed of N-polyvinylcarbazole (Nd=1.696, vd=17.7, θgF=0.69). Thus, the chromatic aberrations are adequately corrected over the entire zooming range.

In a zoom lens according to a fourth numerical example shown in FIG. 13, the zoom ratio is 2.8 and Fno is about 2.9 to 4.9. The resin layer j1 in the first lens unit L1 according to the fourth numerical example is formed of a material obtained by dispersing particles of ITO into N-polyvinylcarbazole, which is a host polymer, at a volume ratio of 12.5% (Nd=1.717, vd=13.2, θgF=0.54).

According to the fourth numerical example, the chromatic aberrations are adequately corrected over the entire zooming range. In particular, the chromatic aberration of magnification at the wide-angle end is adequately corrected.

In a zoom lens according to a fifth numerical example shown in FIG. 17, the zoom ratio is 3.7 and Fno is about 2.9 to 5.8. The resin layer j1 in the first lens unit L1 according to the fifth numerical example is formed of a material obtained by dispersing particles of ITO into fluorene-based UV-curable resin, which is a host polymer, at a volume ratio of 3.0% (Nd=1.633, vd=21.8, θgF=0.57).

According to the fifth numerical example, the chromatic aberrations are adequately corrected over the entire zooming range. In particular, the chromatic aberration of magnification at the wide-angle end is adequately corrected.

In a zoom lens according to a sixth numerical example shown in FIG. 21, the zoom ratio is 3.7 and Fno is about 2.9 to 5.8. The resin layer j1 in the first lens unit L1 according to the sixth numerical example is formed of a material obtained by dispersing particles of ITO into fluorene-based UV-curable resin, which is a host polymer, at a volume ratio of 5.0% (Nd=1.647, vd=18.5, θgF=0.59).

According to the sixth numerical example, the chromatic aberrations are adequately corrected over the entire zooming range. In particular, the chromatic aberration of magnification at the wide-angle end is adequately corrected.

Numerical data of the first to sixth numerical examples are shown below. In each numerical example, the surface number is counted from the object side. R denotes the radius of curvature (mm), D denotes the distance (mm) between surfaces, and Nd and vd denote the refractive index and the Abbe number, respectively, for the d line. In addition, the lens element and the resin layer included in the optical system are denoted by G1 and j1, respectively. BF shows the back focus, and the entire lens length is the distance between the first surface and the image plane. In addition, f denotes the focal length, FNo denotes the F-number, and the field angle ω denotes the half field angle. The two surfaces closest to the image side are glass elements, such as a faceplate. In addition, the symbol is added to the surface numbers for the aspherical surfaces. When X is the displacement from the surface vertex along the optical axis, h is the height of from the optical axis in a direction perpendicular to the optical axis, R is the paraxial radius of curvature, k is the conic constant, and B, C, D, E, . . . are the aspherical coefficients, the shape of the aspherical surface is expressed as follows:

$$x(h) = \frac{(1/R)h^2}{1 + \sqrt{\{1-(1+k)(h/R)^2\}}} + Bh^4 + Ch^6 + Dh^8 + Eh^{10} \ldots$$

In the aspherical coefficients, "E±XX" indicates "×10±XX." Table 1 provided below shows the relationship between the above-described conditional expressions and the numerical examples.

The refractive index of the material in which the ITO particles are dispersed is calculated by the above-described Drude equation.

Table 2 shows the optical characteristics of the material forming the resin layer j1 included in each embodiment. Table 3 shows the optical characteristics of the host polymer of the material in which particles are dispersed and the ITO particles used in the fourth to sixth embodiments.

FIRST NUMERICAL EXAMPLE

| | Unit: mm | | | | |
|---|---|---|---|---|---|
| | Surface Data | | | | |
| Surface No. | R | D | Nd | vd | Effective Diameter |
| 1* | −18.386 | 0.60 | 1.48749 | 70.2 | 7.80 |
| 2 | 4.824 | 0.34 | 1.63555 | 22.7 | 6.40 |

-continued

Unit: mm

| | | | | | |
|---|---|---|---|---|---|
| 3* | 6.269 (Variable) | | | | 6.36 |
| 4* | 4.114 | 2.35 | 1.58313 | 59.4 | 4.36 |
| 5 | −10.675 | 0.18 | | | 4.03 |
| 6 | 9.909 | 0.67 | 1.75520 | 27.5 | 3.71 |
| 7* | 2.955 (Variable) | | | | 3.23 |
| 8* | 17.454 | 1.41 | 1.71999 | 50.2 | 3.52 |
| 9* | −13.255 (Variable) | | | | 3.67 |
| 10 | ∞ | 1.00 | 1.51633 | 64.1 | 6.79 |
| 11 | ∞ | 0.45 | | | 6.92 |

Aspherical Surface Data

| | Conic Constant (K) k | 4th-Order Coefficient (B) B | 6th-Order Coefficient (C) C | 8th-Order Coefficient (D) D | 10th-Order Coefficient (E) E |
|---|---|---|---|---|---|
| 1st Surface | −1.015047E+02 | −6.100110E−04 | 6.097970E−05 | −9.274630E−07 | −1.471830E−08 |
| 3rd Surface | −5.415220E−01 | 8.666660E−04 | −9.110090E−05 | 1.439890E−05 | −4.968880E−07 |
| 4th Surface | −6.646150E−01 | −1.619240E−03 | −7.111170E−05 | −1.211870E−05 | 7.875760E−07 |
| 7th Surface | −5.359010E−01 | 3.564330E−03 | 5.780510E−05 | −1.241210E−04 | 1.176230E−06 |
| 8th Surface | 0.000000E+00 | 5.236460E−03 | 2.822150E−04 | −1.787640E−05 | 5.899860E−07 |
| 9th Surface | −1.196716E+01 | 1.994300E−03 | 2.495980E−04 | 2.087080E−05 | 0.000000E+00 |

Other Data
Zoom Ratio 2.91

| | Wide-Angle End | Intermediate | Telephoto End |
|---|---|---|---|
| Focal Length | 6.12 | 11.65 | 17.81 |
| F-Number | 2.94 | 4.06 | 5.43 |
| Field Angle ω | 30.12 | 16.94 | 11.27 |
| Image Height | 3.55 | 3.55 | 3.55 |
| Lens Length | 26.40 | 24.97 | 27.85 |
| BF | 0.45 | 0.45 | 0.45 |
| Entrance Pupil Position | 5.71 | 3.43 | 1.78 |
| Exit Pupil Position | −13.18 | −18.95 | −24.99 |
| Front Principal Point Position | 9.08 | 8.09 | 7.12 |
| Rear Principal Point Position | −5.67 | −11.20 | −17.36 |

Variable Distance

| | | | |
|---|---|---|---|
| D3 | 10.51 | 4.00 | 1.36 |
| D7 | 1.13 | 1.73 | 2.08 |
| D9 | 7.77 | 12.23 | 17.41 |

Lens Unit Data

| Unit No. | First Surface | Focal Length | Lens Unit Length | Front Principal Point Position | Rear Principal Point Position |
|---|---|---|---|---|---|
| 1 | 3 | −10.22 | 0.94 | 0.50 | −0.10 |
| 2 | 7 | 13.74 | 3.20 | −4.01 | −4.62 |
| 3 | 9 | 10.67 | 1.41 | 0.47 | −0.36 |

Single Lens Data

| Lens | First Surface | Focal Length |
|---|---|---|
| 1 | 1 | −7.77 |
| 2 | 2 | 30.18 |
| 3 | 4 | 5.41 |
| 4 | 6 | −5.82 |
| 5 | 8 | 10.67 |

SECOND NUMERICAL EXAMPLE

Unit: mm

Surface Data

| Surface No. | R | D | Nd | νd | Effective Diameter |
|---|---|---|---|---|---|
| 1* | −16.399 | 0.60 | 1.48749 | 70.2 | 7.80 |
| 2 | 4.638 | 0.40 | 1.62524 | 25.3 | 6.36 |
| 3* | 6.398 (Variable) | | | | 6.32 |
| 4* | 4.121 | 2.39 | 1.58313 | 59.4 | 4.37 |
| 5 | −10.859 | 0.25 | | | 4.03 |
| 6 | 9.835 | 0.56 | 1.75520 | 27.5 | 3.67 |
| 7* | 2.985 (Variable) | | | | 3.25 |
| 8* | 15.879 | 1.35 | 1.71999 | 50.2 | 3.56 |
| 9* | −14.398 (Variable) | | | | 3.68 |
| 10 | ∞ | 1.00 | 1.51633 | 64.1 | 6.78 |
| 11 | ∞ | 0.45 | | | 6.91 |

Aspherical Surface Data

| | Conic Constant (K) k | 4th-Order Coefficient (B) B | 6th-Order Coefficient (C) C | 8th-Order Coefficient (D) D | 10th-Order Coefficient (E) E |
|---|---|---|---|---|---|
| 1st Surface | −8.001450E+01 | −5.621710E−04 | 5.992710E−05 | −9.365040E−07 | −1.432180E−08 |
| 3rd Surface | −2.935760E−01 | 9.952390E−04 | −1.138400E−04 | 1.658560E−05 | −5.791340E−07 |
| 4th Surface | −6.456180E−01 | −1.574150E−03 | −8.002310E−05 | −8.592880E−06 | 4.871380E−07 |
| 7th Surface | −5.328820E−01 | 3.610620E−03 | −1.828610E−05 | −8.794600E−05 | −2.590340E−06 |
| 8th Surface | 0.000000E+00 | 5.593310E−03 | 2.016940E−04 | 9.700490E−06 | −1.537050E−06 |
| 9th Surface | −1.390920E+01 | 2.460040E−03 | 2.281220E−04 | 3.364710E−05 | 0.000000E+00 |

Other Data
Zoom Ratio 2.91

| | Wide-Angle End | Intermediate | Telephoto End |
|---|---|---|---|
| Focal Length | 6.12 | 11.57 | 17.81 |
| F-Number | 2.94 | 4.05 | 5.41 |
| Field Angle ω | 30.12 | 17.06 | 11.27 |
| Image Height | 3.55 | 3.55 | 3.55 |
| Lens Length | 26.37 | 25.02 | 27.98 |
| BF | 0.45 | 0.45 | 0.45 |
| Entrance Pupil Position | 5.70 | 3.47 | 1.81 |
| Exit Pupil Position | −13.19 | −18.94 | −25.11 |
| Front Principal Point Position | 9.07 | 8.14 | 7.22 |
| Rear Principal Point Position | −5.67 | −11.12 | −17.36 |
| Variable Distance | | | |
| D3 | 10.45 | 4.05 | 1.36 |
| D7 | 1.13 | 1.75 | 2.10 |
| D9 | 7.80 | 12.22 | 17.51 |

Lens Unit Data

| Unit No. | First Surface | Focal Length | Lens Unit Length | Front Principal Point Position | Rear Principal Point Position |
|---|---|---|---|---|---|
| 1 | 3 | −10.15 | 1.00 | 0.52 | −0.12 |
| 2 | 7 | 13.76 | 3.20 | −3.97 | −4.63 |
| 3 | 9 | 10.69 | 1.35 | 0.42 | −0.38 |

Single Lens Data

| Lens | First Surface | Focal Length |
|---|---|---|
| 1 | 1 | −7.35 |
| 2 | 2 | 24.80 |
| 3 | 4 | 5.44 |

| | | |
|---|---|---|
| | -continued | |
| | Unit: mm | |
| 4 | 6 | −5.88 |
| 5 | 8 | 10.69 |

THIRD NUMERICAL EXAMPLE

Unit: mm

Surface Data

| Surface No. | R | D | Nd | vd | Effective Diameter |
|---|---|---|---|---|---|
| 1* | −9.775 | 0.65 | 1.51633 | 64.1 | 7.38 |
| 2 | 10.084 | 0.26 | 1.69589 | 17.7 | 6.72 |
| 3* | 15.296 (Variable) | | | | 6.71 |
| 4* | 4.325 | 2.14 | 1.77250 | 49.6 | 4.34 |
| 5 | −29.350 | 0.15 | | | 3.84 |
| 6 | 42.216 | 0.45 | 1.84666 | 23.8 | 3.63 |
| 7* | 4.902 (Variable) | | | | 3.29 |
| 8* | 22.443 | 1.50 | 1.77250 | 49.6 | 3.94 |
| 9* | −27.256 (Variable) | | | | 4.28 |
| 10 | ∞ | 1.00 | 1.51633 | 64.1 | 10.00 |
| 11 | ∞ | 0.58 | | | 10.00 |

Aspherical Surface Data

| | Conic Constant (K) k | 4th-Order Coefficient (B) B | 6th-Order Coefficient (C) C | 8th-Order Coefficient (D) D | 10th-Order Coefficient (E) E |
|---|---|---|---|---|---|
| 1st Surface | −6.780960E+00 | −1.090830E−03 | 4.043700E−05 | 1.778630E−07 | −3.234840E−08 |
| 3rd Surface | 7.569740E−01 | −2.832490E−04 | 8.344170E−06 | 1.998470E−06 | −8.208490E−08 |
| 4th Surface | −9.458660E−02 | −1.065230E−04 | 1.104330E−05 | −6.067690E−06 | 3.358670E−07 |
| 7th Surface | −4.682940E−01 | 3.162630E−03 | 2.977120E−04 | −3.258140E−05 | 7.209230E−06 |
| 8th Surface | 0.000000E+00 | −1.442440E−03 | −5.411870E−05 | −1.160760E−05 | 6.720100E−08 |
| 9th Surface | 0.000000E+00 | −1.435960E−03 | −5.749830E−05 | −5.872390E−06 | 0.000000E+00 |

Other Data
Zoom Ratio 2.83

| | Wide-Angle End | Intermediate | Telephoto End |
|---|---|---|---|
| Focal Length | 6.55 | 13.50 | 18.51 |
| F-Number | 2.94 | 4.08 | 4.91 |
| Field Angle ω | 28.46 | 14.73 | 10.86 |
| Image Height | 3.55 | 3.55 | 3.55 |
| Lens Length | 26.40 | 23.43 | 25.07 |
| BF | 0.58 | 0.58 | 0.58 |
| Entrance Pupil Position | 6.03 | 2.56 | 0.93 |
| Exit Pupil Position | −13.56 | −19.15 | −23.19 |
| Front Principal Point Position | 9.55 | 6.82 | 5.03 |
| Rear Principal Point Position | −5.97 | −12.92 | −17.93 |
| Variable Distance | | | |
| D3 | 10.65 | 2.53 | 0.40 |
| D7 | 2.79 | 3.23 | 3.48 |
| D9 | 6.24 | 10.95 | 14.47 |

-continued

Unit: mm

Lens Unit Data

| Unit No. | First Surface | Focal Length | Lens Unit Length | Front Principal Point Position | Rear Principal Point Position |
|---|---|---|---|---|---|
| 1 | 3 | −12.29 | 0.91 | 0.23 | −0.34 |
| 2 | 7 | 10.75 | 2.74 | −2.30 | −3.20 |
| 3 | 9 | 16.15 | 1.50 | 0.39 | −0.47 |

Single Lens Data

| Lens | First Surface | Focal Length |
|---|---|---|
| 1 | 1 | −9.51 |
| 2 | 2 | 41.67 |
| 3 | 4 | 5.02 |
| 4 | 6 | −6.59 |
| 5 | 8 | 16.15 |

FOURTH NUMERICAL EXAMPLE

Unit: mm

Surface Data

| Surface No. | R | D | Nd | νd | Effective Diameter |
|---|---|---|---|---|---|
| 1* | −9.803 | 0.60 | 1.51633 | 64.1 | 7.47 |
| 2 | 11.874 | 0.21 | 1.71689 | 13.2 | 6.86 |
| 3* | 16.707 (Variable) | | | | 6.84 |
| 4* | 4.299 | 2.13 | 1.77250 | 49.6 | 4.33 |
| 5 | −32.645 | 0.15 | | | 3.82 |
| 6 | 36.416 | 0.45 | 1.84666 | 23.8 | 3.61 |
| 7* | 4.825 (Variable) | | | | 3.27 |
| 8* | 21.011 | 1.38 | 1.77250 | 49.6 | 3.93 |
| 9* | −30.712 (Variable) | | | | 4.24 |
| 10 | ∞ | 1.00 | 1.51633 | 64.1 | 10.00 |
| 11 | ∞ | 0.45 | | | 10.00 |

Aspherical Surface Data

| | Conic Constant (K) k | 4th-Order Coefficient (B) B | 6th-Order Coefficient (C) C | 8th-Order Coefficient (D) D | 10th-Order Coefficient (E) E |
|---|---|---|---|---|---|
| 1st Surface | −6.936748E+00 | −1.067530E−03 | 3.933230E−05 | −2.632200E−08 | −2.279120E−08 |
| 3rd Surface | 1.321124E+00 | −2.665970E−04 | 9.841480E−06 | 1.243370E−06 | −5.024760E−08 |
| 4th Surface | −8.841300E−02 | −7.961990E−05 | 2.277630E−06 | −4.914360E−06 | 3.120830E−07 |
| 7th Surface | −4.132450E−01 | 3.236880E−03 | 2.684700E−04 | −2.361090E−05 | 6.919230E−06 |
| 8th Surface | 0.000000E+00 | −1.419030E−03 | −8.772540E−05 | −8.028340E−06 | −2.308090E−07 |
| 9th Surface | 0.000000E+00 | −1.464090E−03 | −7.381210E−05 | −6.189210E−06 | 0.000000E+00 |

Other Data
Zoom Ratio 2.83

| | Wide-Angle End | Intermediate | Telephoto End |
|---|---|---|---|
| Focal Length | 6.55 | 13.10 | 18.51 |
| F-Number | 2.94 | 4.00 | 4.89 |
| Field Angle ω | 28.46 | 15.16 | 10.86 |
| Image Height | 3.55 | 3.55 | 3.55 |
| Lens Length | 26.40 | 23.11 | 24.71 |
| BF | 0.45 | 0.45 | 0.45 |

-continued

Unit: mm

|  | | | |
|---|---|---|---|
| Entrance Pupil Position | 6.13 | 2.71 | 0.87 |
| Exit Pupil Position | −13.47 | −18.73 | −23.10 |
| Front Principal Point Position | 9.60 | 6.87 | 4.83 |
| Rear Principal Point Position | −6.10 | −12.65 | −18.06 |
| Variable Distance | | | |
| D3 | 10.91 | 2.83 | 0.40 |
| D7 | 2.77 | 3.26 | 3.57 |
| D9 | 6.34 | 10.65 | 14.37 |

Lens Unit Data

| Unit No. | First Surface | Focal Length | Lens Unit Length | Front Principal Point Position | Rear Principal Point Position |
|---|---|---|---|---|---|
| 1 | 3 | −12.59 | 0.81 | 0.19 | −0.32 |
| 2 | 7 | 10.79 | 2.73 | −2.34 | −3.22 |
| 3 | 9 | 16.34 | 1.38 | 0.32 | −0.47 |

Single Lens Data

| Lens | First Surface | Focal Length |
|---|---|---|
| 1 | 1 | −10.30 |
| 2 | 2 | 56.23 |
| 3 | 4 | 5.04 |
| 4 | 6 | −6.61 |
| 5 | 8 | 16.34 |

FIFTH NUMERICAL EXAMPLE 30

Unit: mm

Surface Data

| Surface No. | R | D | Nd | νd | Effective Diameter |
|---|---|---|---|---|---|
| 1* | −11.676 | 0.70 | 1.58313 | 59.4 | 7.84 |
| 2 | 8.457 | 0.48 | 1.63267 | 21.8 | 7.12 |
| 3* | 16.203 (Variable) | | | | 7.10 |
| 4* | 4.185 | 2.25 | 1.77250 | 49.6 | 4.46 |
| 5 | −18.301 | 0.15 | | | 4.20 |
| 6 | −64.598 | 0.58 | 1.84666 | 23.8 | 3.97 |
| 7* | 6.293 (Variable) | | | | 3.56 |
| 8* | 8.691 | 1.37 | 1.68893 | 31.1 | 5.39 |
| 9 | 12.000 (Variable) | | | | 5.32 |
| 10 | ∞ | 1.00 | 1.51633 | 64.1 | 10.00 |
| 11 | ∞ | 0.46 | | | 10.00 |

Aspherical Surface Data

| | Conic Constant (K) k | 4th-Order Coefficient (B) B | 6th-Order Coefficient (C) C | 8th-Order Coefficient (D) D | 10th-Order Coefficient (E) E |
|---|---|---|---|---|---|
| 1st Surface | −1.415030E+00 | −5.468480E−04 | −3.659690E−06 | 2.402960E−06 | −6.437450E−08 |
| 3rd Surface | −4.744410E+01 | 8.884470E−04 | −1.089820E−04 | 8.845670E−06 | −2.159310E−07 |
| 4th Surface | −1.324440E−01 | 3.536550E−04 | −4.401180E−06 | 1.485380E−06 | −2.925240E−07 |
| 7th Surface | 6.140580E−01 | 4.142840E−03 | 3.826500E−04 | −1.781070E−06 | 6.804560E−06 |
| 8th Surface | 0.000000E+00 | 7.722760E−05 | −5.374280E−06 | 1.407800E−06 | −8.555420E−08 |

-continued

Unit: mm

Other Data
Zoom Ratio 3.75

| | Wide-Angle End | Intermediate | Telephoto End |
|---|---|---|---|
| Focal Length | 6.15 | 15.12 | 23.04 |
| F-Number | 2.94 | 4.44 | 5.83 |
| Field Angle ω | 30.00 | 13.21 | 8.76 |
| Image Height | 3.55 | 3.55 | 3.55 |
| Lens Length | 27.51 | 23.79 | 27.52 |
| BF | 0.46 | 0.49 | 0.47 |
| Entrance Pupil Position | 6.44 | 2.68 | 1.07 |
| Exit Pupil Position | −12.36 | −17.91 | −24.17 |
| Front Principal Point Position | 9.64 | 5.37 | 2.57 |
| Rear Principal Point Position | −5.69 | −14.63 | −22.57 |
| Variable Distance | | | |
| D3 | 12.29 | 2.55 | 0.40 |
| D7 | 7.00 | 5.90 | 6.81 |
| D9 | 1.23 | 8.32 | 13.31 |

Lens Unit Data

| Unit No. | First Surface | Focal Length | Lens Unit Length | Front Principal Point Position | Rear Principal Point Position |
|---|---|---|---|---|---|
| 1 | 3 | −11.85 | 1.18 | 0.31 | −0.41 |
| 2 | 7 | 8.52 | 2.98 | −1.67 | −2.83 |
| 3 | 9 | 39.15 | 1.37 | −1.82 | −2.51 |

Single Lens Data

| Lens | First Surface | Focal Length |
|---|---|---|
| 1 | 1 | −8.30 |
| 2 | 2 | 27.31 |
| 3 | 4 | 4.61 |
| 4 | 6 | −6.75 |
| 5 | 8 | 39.15 |

SIXTH NUMERICAL EXAMPLE

Unit: mm

Surface Data

| Surface No. | R | D | Nd | vd | Effective Diameter |
|---|---|---|---|---|---|
| 1* | −11.605 | 0.70 | 1.58313 | 59.4 | 7.83 |
| 2 | 9.564 | 0.38 | | | 7.13 |
| 3* | 16.316 (Variable) | | | | 7.11 |
| 4* | 4.195 | 2.25 | 1.77250 | 49.6 | 4.46 |
| 5 | −17.852 | 0.15 | | | 4.19 |
| 6 | −47.065 | 0.59 | 1.84666 | 23.8 | 3.97 |
| 7* | 6.436 (Variable) | | | | 3.56 |
| 8* | 8.497 | 1.36 | 1.68893 | 31.1 | 5.30 |
| 9 | 12.000 (Variable) | | | | 5.23 |
| 10 | ∞ | 1.00 | 1.51633 | 64.1 | 10.00 |
| 11 | ∞ | 0.46 | | | 10.00 |

Aspherical Surface Data

| | Conic Constant (K) k | 4th-Order Coefficient (B) B | 6th-Order Coefficient (C) C | 8th-Order Coefficient (D) D | 10th-Order Coefficient (E) E |
|---|---|---|---|---|---|
| 1st Surface | −1.094980E+00 | −5.605380E−04 | 2.900140E−06 | 2.113440E−06 | −6.071910E−08 |
| 3rd Surface | −4.944740E+01 | 8.874350E−04 | −1.061340E−04 | 8.741110E−06 | −2.193240E−07 |

-continued

| | | | Unit: mm | | |
|---|---|---|---|---|---|
| 4th Surface | −1.225830E−01 | 3.526260E−04 | 2.187490E−07 | 8.592070E−07 | −2.337150E−07 |
| 7th Surface | 5.438080E−01 | 4.184670E−03 | 3.697830E−04 | 1.000340E−06 | 6.407970E−06 |
| 8th Surface | 0.000000E+00 | 4.427490E−05 | −3.738360E−06 | 1.186860E−06 | −7.522560E−08 |

Other Data
Zoom Ratio 3.75

| | Wide-Angle End | Intermediate | Telephoto End |
|---|---|---|---|
| Focal Length | 6.15 | 15.12 | 23.04 |
| F-number | 2.94 | 4.43 | 5.81 |
| Field Angle ω | 30.00 | 13.21 | 8.76 |
| Image Height | 3.55 | 3.55 | 3.55 |
| Lens Length | 27.51 | 23.74 | 27.51 |
| BF | 0.46 | 0.48 | 0.46 |
| Entrance Pupil Position | 6.42 | 2.64 | 1.02 |
| Exit Pupil Position | −12.46 | −17.97 | −24.30 |
| Front Principal Point Position | 9.64 | 5.37 | 2.62 |
| Rear Principal Point Position | −5.69 | −14.64 | −22.58 |
| Variable Distance | | | |
| D3 | 12.32 | 2.55 | 0.40 |
| D7 | 6.67 | 5.58 | 6.49 |
| D9 | 1.63 | 8.68 | 13.72 |

Lens Unit Data

| Unit No. | First Surface | Focal Length | Lens Unit Length | Front Principal Point Position | Rear Principal Point Position |
|---|---|---|---|---|---|
| 1 | 3 | −11.86 | 1.08 | 0.28 | −0.38 |
| 2 | 7 | 8.60 | 2.99 | −1.70 | −2.86 |
| 3 | 9 | 36.50 | 1.36 | −1.68 | −2.37 |

Single Lens Data

| Lens | First Surface | Focal Length |
|---|---|---|
| 1 | 1 | −8.88 |
| 2 | 2 | 34.93 |
| 3 | 4 | 4.60 |
| 4 | 6 | −6.65 |
| 5 | 8 | 36.50 |

TABLE 1

| | Conditional Expression | Upper Limit | Lower Limit | 1st Example | 2nd Example | 3rd Example | 4th Example | 5th Example | 6th Example |
|---|---|---|---|---|---|---|---|---|---|
| | νdg | | | 70.2 | 70.2 | 64.1 | 64.1 | 59.4 | 59.4 |
| (2) | νdj | | | 22.7 | 25.2 | 17.7 | 13.2 | 21.8 | 18.5 |
| (1) | \|νdg − νdj\| | | 31 | 47.5 | 45.0 | 46.4 | 50.9 | 37.6 | 40.9 |
| | θgFj | | | 0.689 | 0.626 | 0.686 | 0.538 | 0.567 | 0.593 |
| (3) | \|ΔθgFj\| | 0.1 | | 0.084 | 0.024 | 0.071 | 0.084 | 0.040 | 0.020 |
| (4) | ΔθgFj | −0.1 | 0.038 | 0.084 | 0.024 | 0.071 | −0.084 | −0.040 | −0.020 |
| | fg | | | −7.773 | −7.348 | −9.507 | −10.303 | −8.304 | −8.883 |
| | fj | | | 30.179 | 24.801 | 41.671 | 56.233 | 27.305 | 34.927 |
| (5) | fg/fj | | 0 | −0.258 | −0.296 | −0.228 | −0.183 | −0.304 | −0.254 |

TABLE 2

|  | 1st Example UV-curable resin | 2nd Example Fluorene-based UV-curable resin | 3rd Example N-polyvinyl-carbazole | 4th Example ITO 12.5% N-polyvinyl-carbazole | 5th Example ITO 3.0% Fluorene-based UV-curable resin | 6th Example ITO 5.0% UV-curable resin |
|---|---|---|---|---|---|---|
| d-Line Refractive Index | 1.63555 | 1.62524 | 1.69591 | 1.71689 | 1.63267 | 1.64734 |
| g-Line Refractive Index | 1.67532 | 1.65852 | 1.75164 | 1.78352 | 1.66951 | 1.69259 |
| C-Line Refractive Index | 1.62807 | 1.61825 | 1.68528 | 1.69977 | 1.62393 | 1.63698 |
| F-Line Refractive Index | 1.65604 | 1.64302 | 1.72465 | 1.75422 | 1.65301 | 1.67189 |
| vd | 22.7 | 25.2 | 17.7 | 13.2 | 21.8 | 18.5 |
| θgF | 0.689 | 0.626 | 0.686 | 0.538 | 0.567 | 0.593 |

TABLE 3

|  | UV-curable resin | N-polyvinylcarbazole | Fluorene-based UV-curable resin | ITO |
|---|---|---|---|---|
| d-Line Refractive Index | 1.63555 | 1.69591 | 1.62524 | 1.85712 |
| g-Line Refractive Index | 1.67532 | 1.75164 | 1.65852 | 1.99244 |
| C-Line Refractive Index | 1.62807 | 1.68528 | 1.61825 | 1.79794 |
| F-Line Refractive Index | 1.65604 | 1.72465 | 1.64302 | 1.94870 |
| vd | 22.7 | 17.7 | 25.2 | 5.7 |
| θgF | 0.689 | 0.686 | 0.626 | 0.290 |

Next, a digital still camera (optical apparatus) including a zoom lens according to at least one embodiment of the present invention as an imaging optical system will be described with reference to FIG. 27.

Figure 27:
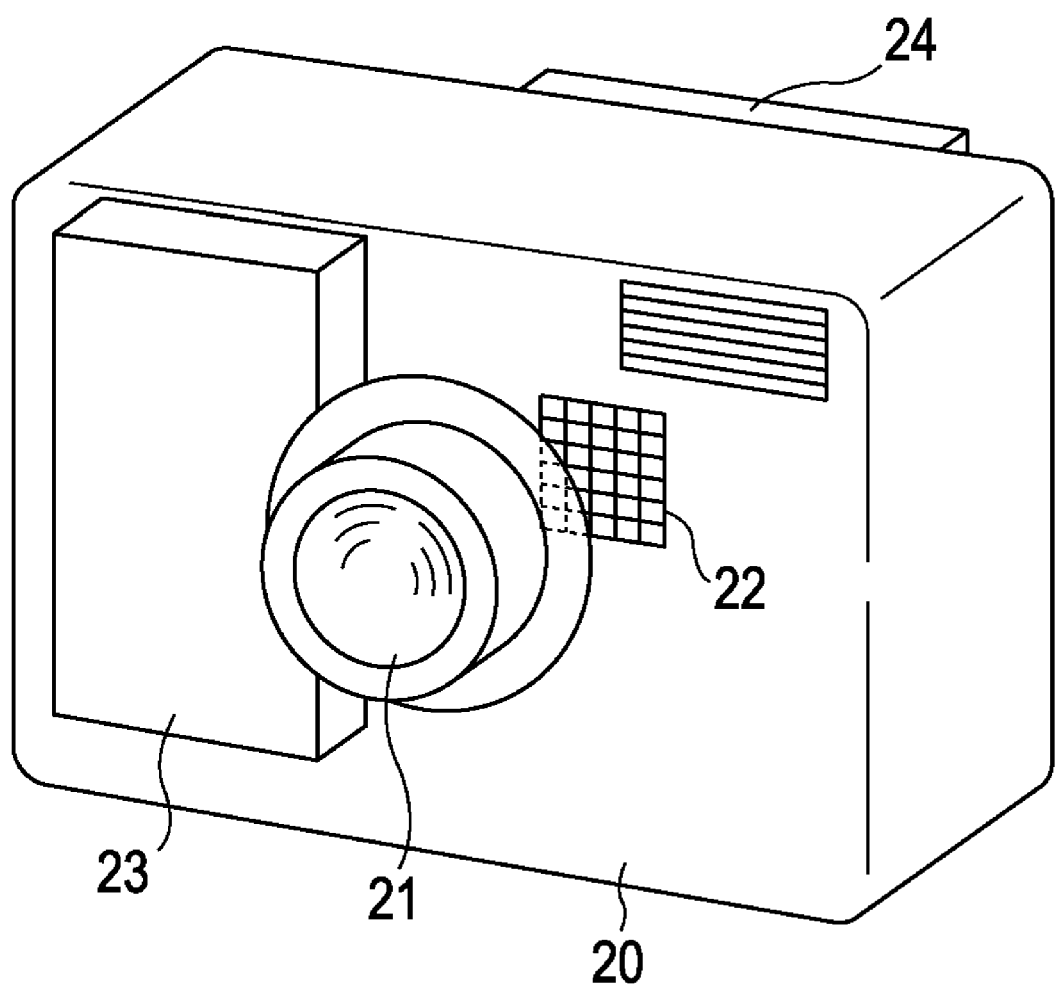
FIG. 27 is a schematic diagram illustrating the main part of an optical apparatus according to an embodiment of a present invention.

Referring to FIG. 27, a camera body 20 includes an imaging optical system 21 including the optical system according to at least one embodiment of the present embodiment. A solid-state image pickup element (photoelectric conversion element) 22, such as a CCD sensor and a CMOS sensor, for receiving an object image formed by the imaging optical system 21 is disposed in the camera body 20. A memory 23 records information corresponding to the object image that is subjected to photoelectric conversion performed by the image-pickup element 22. A finder 24 is formed of, for example, a liquid crystal display panel or the like and allows a user to observe the object image formed on the image-pickup element 22. When the zoom lens according to at least one embodiment of the present invention is included in an optical apparatus such as the digital still camera, a small optical apparatus which provides high optical performance can be obtained.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2008-009079 filed Jan. 18, 2008, which is hereby incorporated by reference herein in its entirety.

What is claimed is:

1. A zoom lens comprising:
   a first lens unit having a negative refractive power; and
   a second lens unit having a positive refractive power,
   wherein the first lens unit and the second lens unit are arranged in order from the object side to the image side,
   wherein the zoom lens performs zooming by changing a distance between the lens units,
   wherein the first lens unit includes a compound optical element including a lens element and a resin layer having optical characteristics different from optical characteristics of the lens element, the resin layer being laminated on the lens element, and
   wherein the following conditions are satisfied:

$$31 < |\nu dg - \nu dj|$$

$$26 > \nu dj$$

$$0.10 > |\Delta\theta gFj|$$

where $\nu dg$ is an Abbe number of a material of the lens element, and $\nu dj$ and $\Delta\theta gFj$ are an Abbe number and an anomalous partial dispersion ratio, respectively, of a material of the resin layer.

2. The zoom lens according to claim 1, wherein the anomalous partial dispersion ratio $\Delta\theta gFj$ of the material of the resin layer satisfies the following condition:

$$-0.10 < \Delta\theta gFj < 0.038.$$

3. The zoom lens according to claim 1, wherein the following condition is satisfied:

$$fg/fj < 0$$

where $fg$ is a focal length of the lens element in the air and $fj$ is a focal length of the resin layer in the air.

4. The zoom lens according to claim 1, wherein at least one surface of the lens element has an aspherical shape.

5. The zoom lens according to claim 1, wherein at least one surface of the resin layer has an aspherical shape.

6. The zoom lens according to claim 1, wherein the lens element is formed by molding a glass material.

7. The zoom lens according to claim 1, further comprising an ultraviolet absorption film positioned on the object side of the resin layer.

8. The zoom lens according to claim 1, wherein the resin layer is disposed on the image side of the lens element.

9. The zoom lens according to claim 1, further comprising a third lens unit having a positive refractive power, the third lens unit being positioned on the image side of the second lens unit and moving independently of the first and second lens units during zooming.

10. An optical apparatus comprising:
the zoom lens according to claim 1; and
an image pickup element which receives an image formed by the zoom lens.

* * * * *